(12) United States Patent
Morita et al.

(10) Patent No.: US 10,218,891 B2
(45) Date of Patent: Feb. 26, 2019

(54) COMMUNICATION APPARATUS, CONTROL METHOD FOR THE SAME, AND STORAGE MEDIUM FOR PRIORITY IMAGE TRANSFER

(71) Applicant: CANON KABUSHIKI KAISHA, Tokyo (JP)

(72) Inventors: Hiroyasu Morita, Kawasaki (JP); Takahiko Oyachi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/899,461

(22) Filed: Feb. 20, 2018

(65) Prior Publication Data

US 2018/0241924 A1 Aug. 23, 2018

(30) Foreign Application Priority Data

Feb. 22, 2017 (JP) .................................. 2017-031383
Oct. 26, 2017 (JP) .................................. 2017-207384

(51) Int. Cl.
*H04N 5/232* (2006.01)
*G11B 31/00* (2006.01)
(Continued)

(52) U.S. Cl.
CPC ........... *H04N 5/232* (2013.01); *G11B 31/006* (2013.01); *H04N 1/00206* (2013.01); *H04N 1/2112* (2013.01); *H04N 2201/0055* (2013.01)

(58) Field of Classification Search
CPC ... H04N 5/232; H04N 1/00206; G11B 31/006
See application file for complete search history.

(56) References Cited

U.S. PATENT DOCUMENTS 8,453,148 B1 * 5/2013 Hobbs .................. G06F 3/1454
718/102
8,712,120 B1 * 4/2014 Reicher .................. H04L 67/02
382/128

(Continued)

FOREIGN PATENT DOCUMENTS

| EP | 2026554 A1 | 2/2009 |
| JP | 2009-048520 A | 3/2009 |
| JP | 2010-074239 A | 4/2010 |

OTHER PUBLICATIONS

The above patent documents were cited in a British Search Report dated Aug. 13, 2018, which is enclosed that issued in the corresponding U.K. Patent Application No. 1802391.1.

*Primary Examiner* — Nicholas G Giles
(74) *Attorney, Agent, or Firm* — Cowan, Liebowitz & Latman, P.C.

(57) ABSTRACT

A communication apparatus, in response to a first operation of pressing both a first operation member and a second operation member being performed during display of an image, designates the image being displayed as an image to be transferred, which is to be transferred to the external apparatus, and in response to a second operation that is different from the first operation and uses a plurality of operation members being performed, designates the image being displayed as an image to be priority transferred, which is to be transferred with greater priority than the image to be transferred. The plurality of operation members to be used in the second operation include at least one of the first operation member and the second operation member.

27 Claims, 23 Drawing Sheets

(51) Int. Cl.
*H04N 1/00* (2006.01)
*H04N 1/21* (2006.01)

(56) References Cited

U.S. PATENT DOCUMENTS

| | | | |
|---|---|---|---|
| 2001/0023438 A1* | 9/2001 | Ishida | H04N 1/00933 709/224 |
| 2011/0028096 A1* | 2/2011 | Tokunaga | H04W 4/21 455/41.2 |
| 2017/0180626 A1 | 6/2017 | Hayashi et al. | |

* cited by examiner

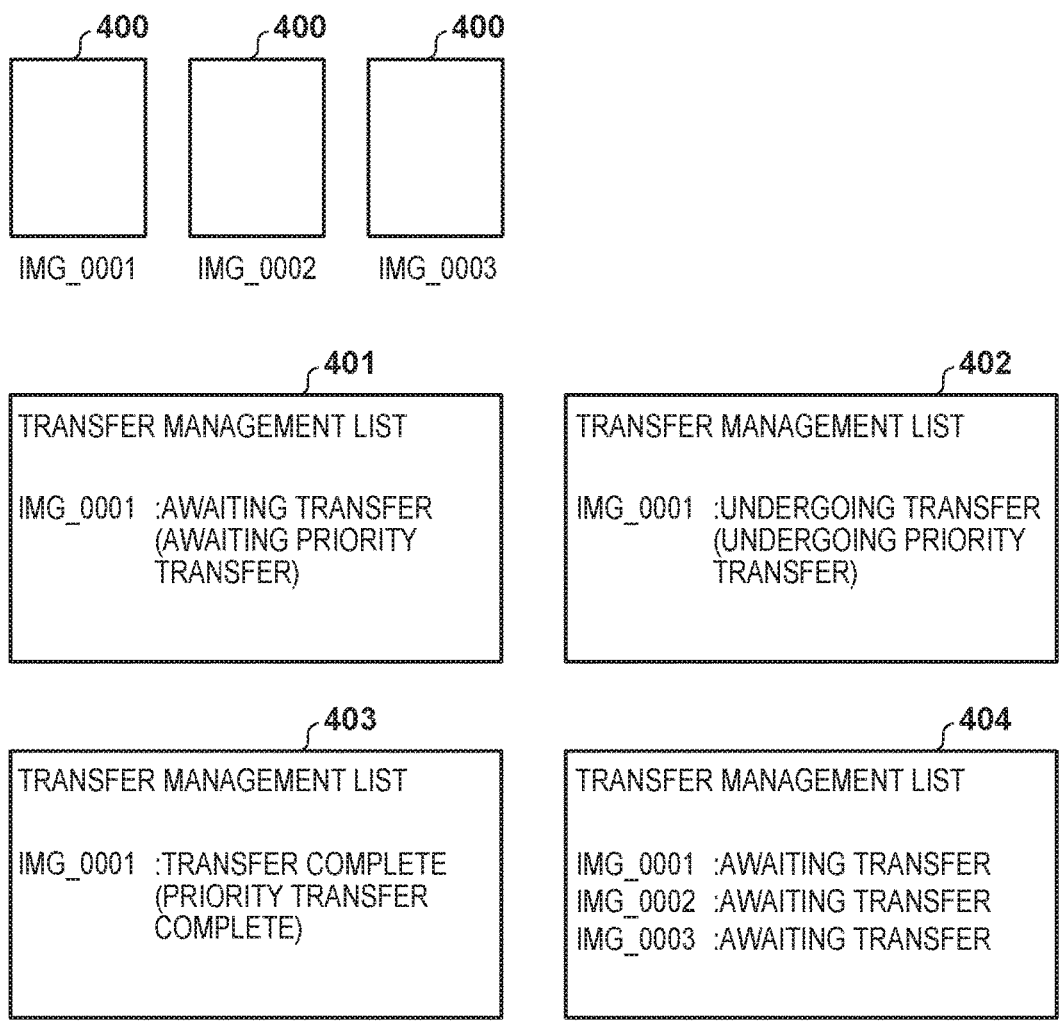

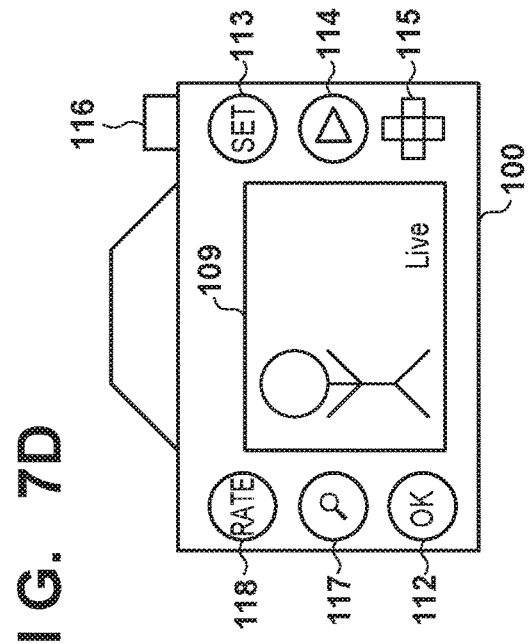
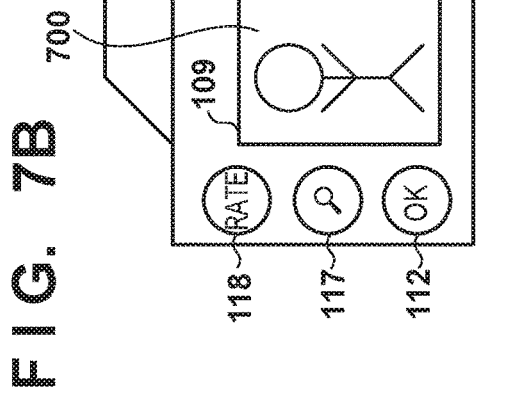
FIG. 7A
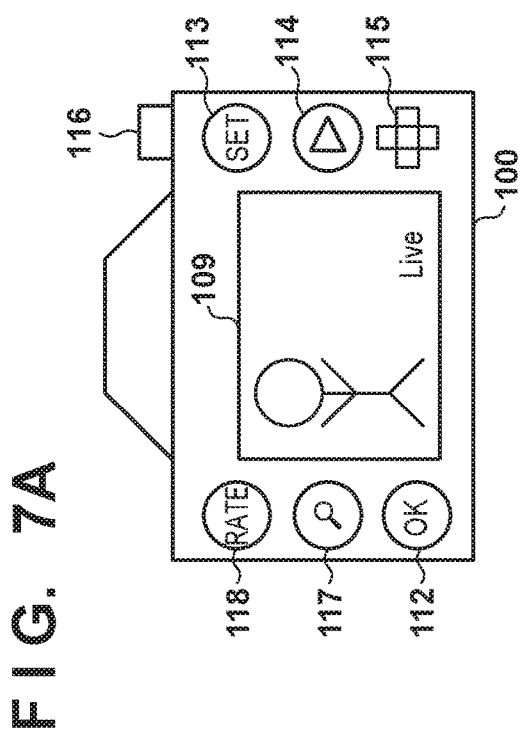
FIG. 7B
FIG. 7C
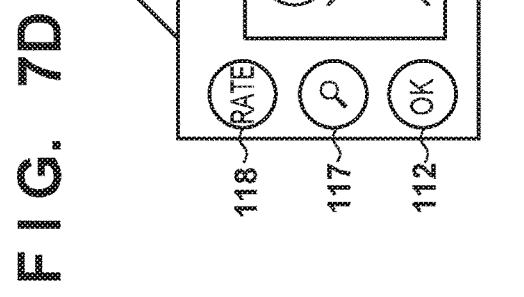
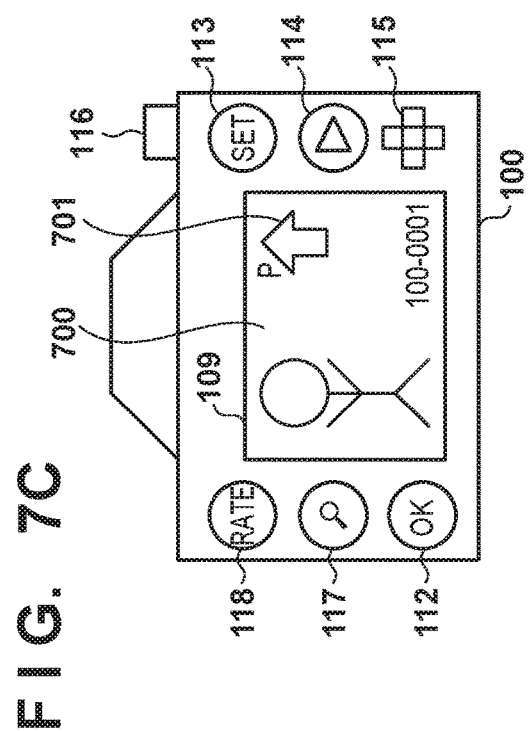
FIG. 7D

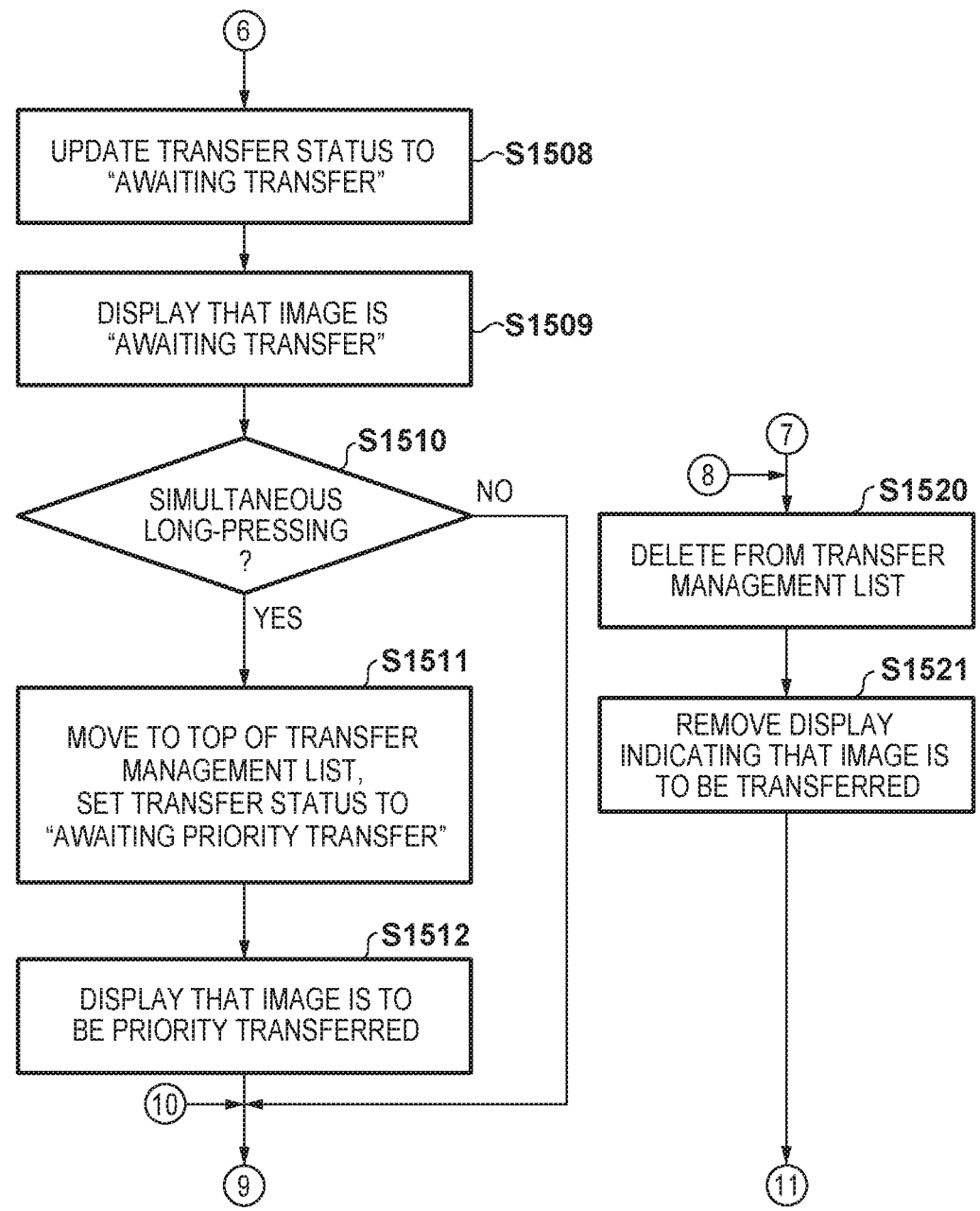

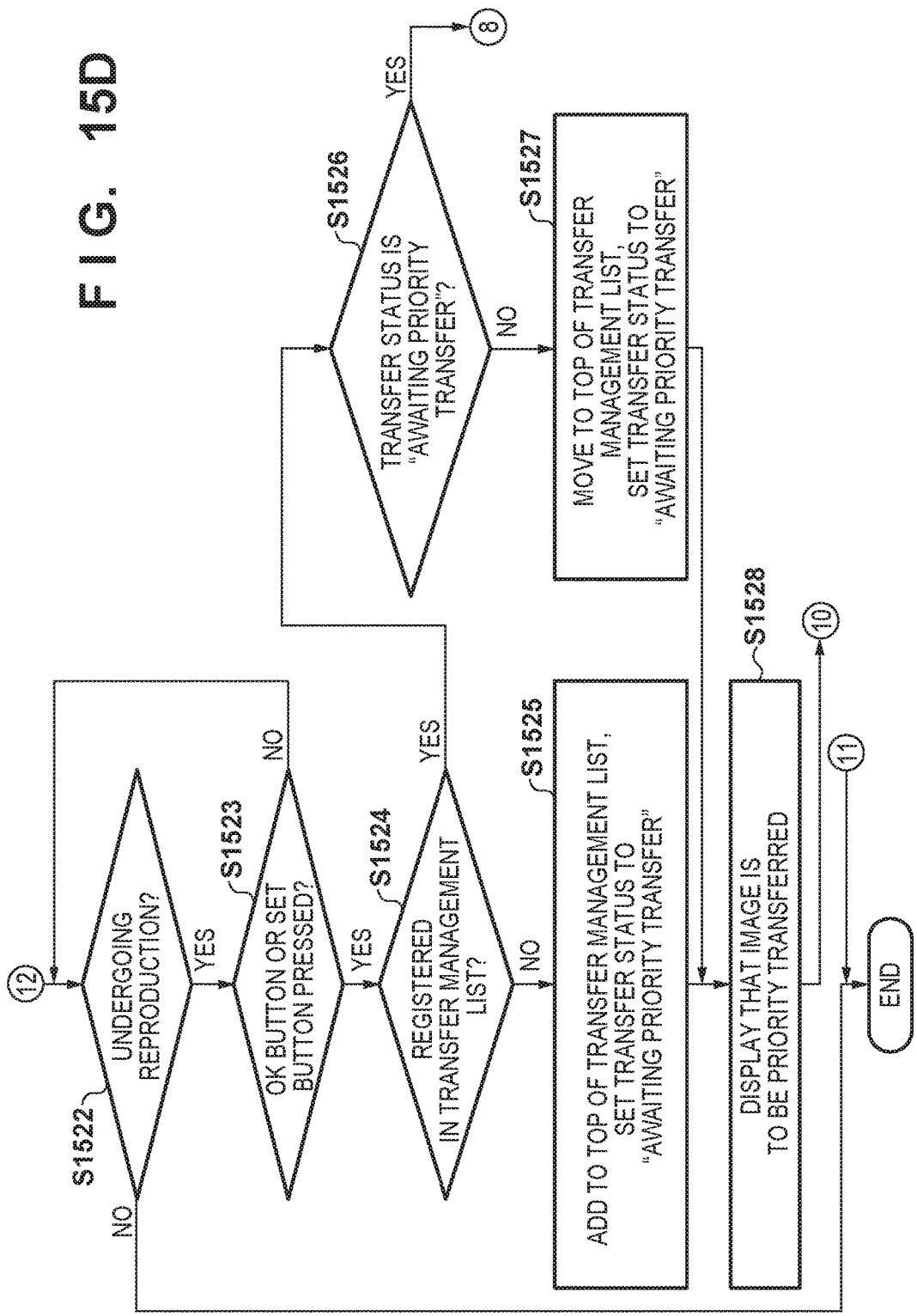

COMMUNICATION APPARATUS, CONTROL METHOD FOR THE SAME, AND STORAGE MEDIUM FOR PRIORITY IMAGE TRANSFER

BACKGROUND OF THE INVENTION

Field of the Invention

The present invention relates to a communication apparatus, control method for the same, and storage medium, particularly relates to a technique for transferring images between apparatuses.

Description of the Related Art

Accompanying an improvement in the speed of transferring data via networks in recent years, image capturing apparatuses such as cameras have been able to transfer shot images to external apparatuses such as server computers via networks. With this kind of image transfer function, a user of an image capturing apparatus can designate images that he or she wants to transfer as images to be transferred. Then, the images designated as images to be transferred are sequentially transferred from the image capturing apparatus to the external apparatus. It is desirable that this operation of designating images to be transferred is easy for the user and is performed with few procedures, such as pushing multiple buttons, for example. Japanese Patent Laid-Open No. 2010-74239 discloses a technique of controlling whether the image shot with the camera is to be transferred automatically, or whether it is to be transferred according to a user instruction.

Incidentally, when the images designated as images to be transferred are to be sequentially transferred as described above, it is convenient to have a means by which images that are later in the sequence and images not selected as images to be transferred can be transferred with priority by interrupting images that are earlier in the sequence.

SUMMARY OF THE INVENTION

The present invention has been made in consideration of the aforementioned problems, and realizes a technique according to which an image to be transferred can be selected quickly with a simple operation and transferred with priority.

In order to solve the aforementioned problems, the present invention provides a communication apparatus, comprising: a communication unit capable of communicating with an external apparatus; a display unit configured to display an image; an operation unit configured to accept a user operation; and a designation unit configured to, in response to a first operation of pressing both a first operation member and a second operation member being performed during display of an image, designating the image being displayed as an image to be transferred, which is to be transferred to the external apparatus, wherein in response to a second operation that is different from the first operation and uses a plurality of operation members being performed, the designation unit designates the image being displayed as an image to be priority transferred, which is to be transferred with greater priority than the image to be transferred, and the plurality of operation members to be used in the second operation include at least one of the first operation member and the second operation member.

In order to solve the aforementioned problems, the present invention provides a communication apparatus, comprising: a communication unit capable of communicating with an external apparatus; a display unit configured to display an image; an operation unit configured to accept a user operation; and a designation unit configured to, in response to a first operation of pressing both a first operation member and a second operation member being performed during display of an image, designating the image being displayed as an image to be transferred, which is to be transferred to the external apparatus, wherein the designation unit designates the image being displayed as an image to be priority transferred in response to an operation of pressing both the first operation member and the second operation member during display of an image immediately after image capturing processing.

In order to solve the aforementioned problems, the present invention provides a control method of a communication apparatus which has a communication unit capable of communicating with an external apparatus, a display unit configured to display an image, and an operation unit configured to accept a user operation, the method comprising: designating, in response to a first operation of putting both a first operation member and a second operation member in a pressed state being performed during display of an image, the image being displayed as an image to be transferred, which is to be transferred to the external apparatus, and designating the image being displayed as an image to be priority transferred, which is to be transferred with greater priority than the image to be transferred, in response to a second operation, which is different from the first operation and uses a plurality of operation members, being performed, wherein the plurality of operation members to be used in the second operation include at least one of the first operation member and the second operation member.

In order to solve the aforementioned problems, the present invention provides a control method of a communication apparatus which has a communication unit capable of communicating with an external apparatus, a display unit configured to display an image, and an operation unit configured to accept a user operation, the method comprising: designating, in response to a first operation of putting both a first operation member and a second operation member in a pressed state being performed during display of an image, the image being displayed as an image to be transferred, which is to be transferred to the external apparatus, and designating the image being displayed as an image to be priority transferred in response to an operation of pressing both the first operation member and the second operation member being performed during display of an image immediately after image capturing processing.

In order to solve the aforementioned problems, the present invention provides a non-transitory computer-readable storage medium storing a program for causing a computer to function as a communication apparatus, comprising: a communication unit capable of communicating with an external apparatus; a display unit configured to display an image; an operation unit configured to accept a user operation; and a designation unit configured to, in response to a first operation of pressing both a first operation member and a second operation member being performed during display of an image, designating the image being displayed as an image to be transferred, which is to be transferred to the external apparatus, wherein in response to a second operation that is different from the first operation and uses a plurality of operation members being performed, the designation unit designates the image being displayed as an image to be priority transferred, which is to be transferred with greater priority than the image to be transferred, and the plurality of operation members to be used in the second operation include at least one of the first operation member and the second operation member.

In order to solve the aforementioned problems, the present invention provides a non-transitory computer-readable storage medium storing a program for causing a computer to function as a communication apparatus, comprising: a communication unit capable of communicating with an external apparatus; a display unit configured to display an image; an operation unit configured to accept a user operation; and a designation unit configured to, in response to a first operation of pressing both a first operation member and a second operation member being performed during display of an image, designating the image being displayed as an image to be transferred, which is to be transferred to the external apparatus, wherein the designation unit designates the image being displayed as an image to be priority transferred in response to an operation of pressing both the first operation member and the second operation member during display of an image immediately after image capturing processing.

According to the present invention, an image to be transferred can be selected quickly with a simple operation and transferred with priority.

Further features of the present invention will become apparent from the following description of exemplary embodiments (with reference to the attached drawings).

BRIEF DESCRIPTION OF THE DRAWINGS

FIG. 4 is a diagram illustrating a transfer management list to be used in image transfer processing of the present embodiment.

FIGS. 7A to 7D are diagrams showing a display example in the case of performing priority transfer processing at a time of quick preview according to Embodiment 1.

FIGS. 15A to 15D are flowcharts showing priority transfer processing at a time of image reproduction according to Embodiment 3.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The present embodiment will describe a system in which an image capturing apparatus such as a digital camera or a communication apparatus having a camera function transfers content such as images to an external apparatus such as a server computer (PC) via a communication network. Note that the image capturing apparatus of the present embodiment is not limited to being a digital camera, and for example, a tablet device, a media player, a monitoring camera, a medical device, or the like may be used thereas. Also, for example, a smartphone, which is a type of mobile phone, a digital camera with a communication function, a tablet device, or the like is envisioned as the communication apparatus having the camera function. Also, the external apparatus of the present invention is not limited to being a server computer, and for example, a smartphone, which is a type of mobile phone, a digital camera with a communication function, a tablet device, a personal computer (PC), or the like may be used thereas.

Apparatus Configuration

The configuration and functions of an image capturing apparatus 100 of the present embodiment will be generally described with reference to FIGS. 1A and 1B.

Figure 1A:
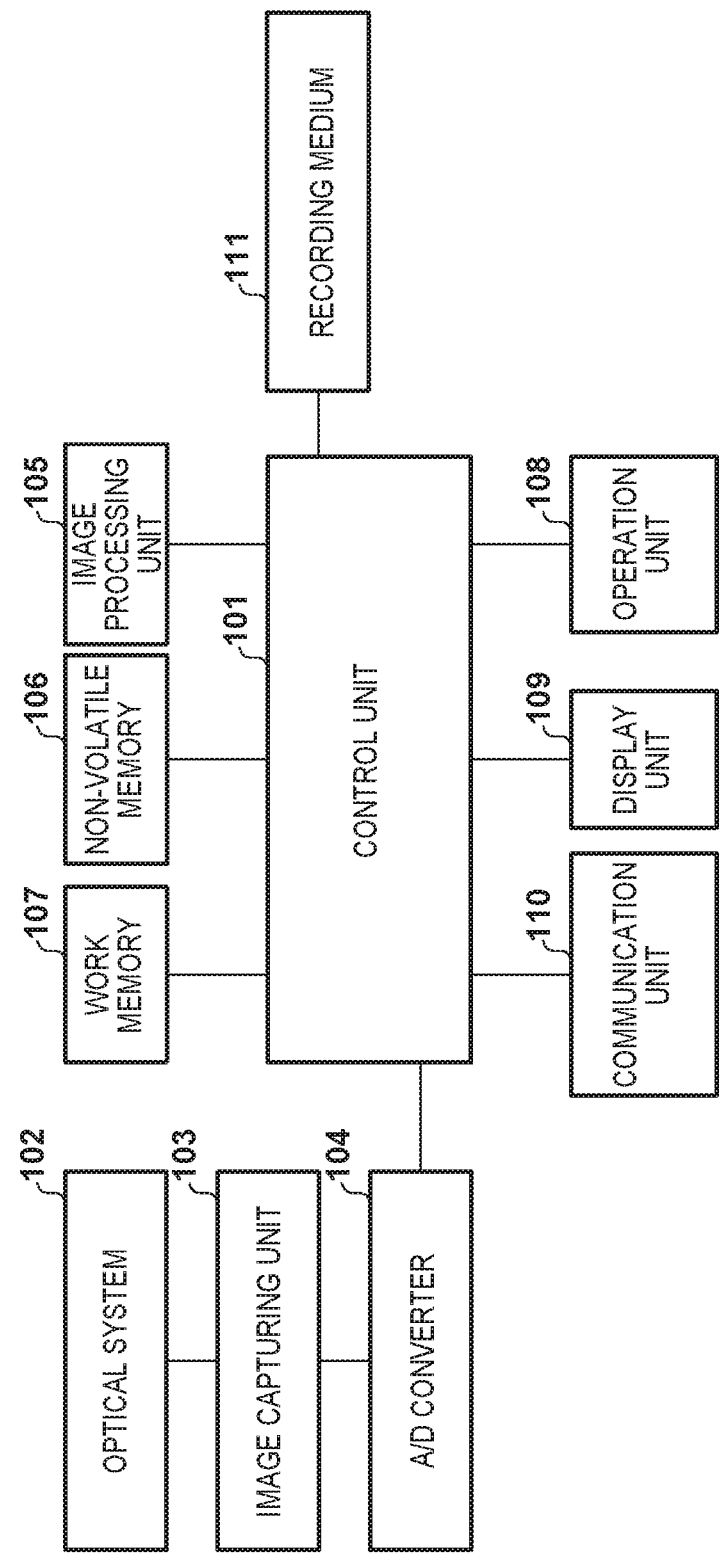
FIG. 1A is a functional block diagram of an image capturing apparatus of the present embodiment.
Figure 1B:
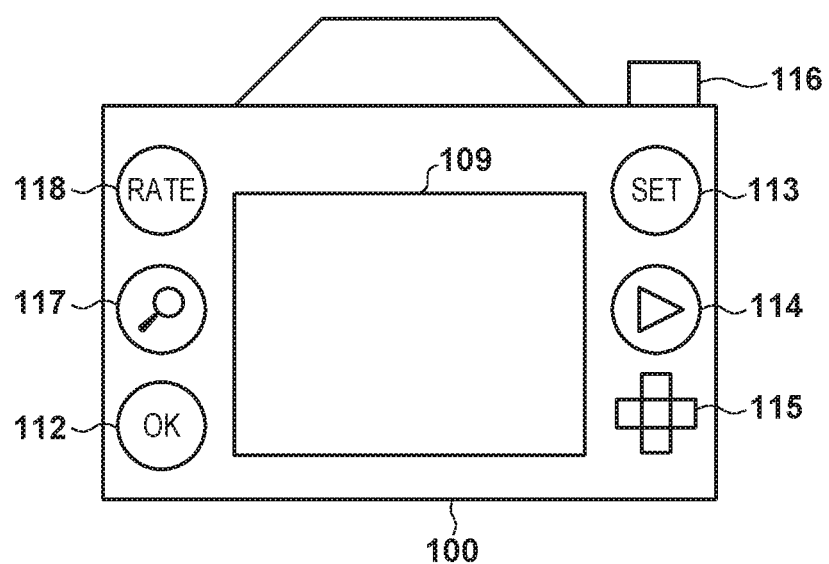
FIG. 1B is a back view of the image capturing apparatus of the present embodiment.

FIG. 1A is a functional block diagram of an image capturing apparatus 100 of the present embodiment, and FIG. 1B is a back view of the image capturing apparatus 100.

In FIG. 1A, a control unit 101 is an arithmetic processing unit (CPU) which comprehensively controls the overall image capturing apparatus 100, and implements various types of processing of flowcharts (to be described later) by executing programs stored in a nonvolatile memory 106 (to be described later). Note that a plurality of pieces of hardware may control the overall apparatus by dividing processes instead of the control unit 101 controlling the overall apparatus.

An optical system 102 includes a lens group including a zoom lens and a focus lens and a shutter having a stop function. An image capturing unit 103 is an image sensor constituted by a CCD, CMOS device, or the like which converts an object image into an electrical signal. An A/D converter 104 converts an analog image signal output from the image capturing unit 103 into a digital signal.

An image processing unit 105 performs resizing processing, such as pixel interpolation and reduction, and color conversion processing on image data such as a moving image or a still image captured by the image capturing unit 103. The image processing unit 105 generates an image file by performing compressing encoding by JPEG or the like on the still image data resulting from the above processing or by encoding the moving image data resulting from the above processing by MPEG2, H.264 or the like, and records the data in the recording medium 111. The image processing unit 105 also performs predetermined calculation processing using the captured image data, and the control unit 101 performs AF (Automatic Focus) processing and AE (Automatic Exposure) processing by controlling the focus lens, the aperture, and the shutter of the optical system 102 based on the obtained calculation result. Furthermore, the image processing unit 105 also generates a live view image for confirming composition and focus at the time of shooting.

The nonvolatile memory 106 is an electrically erasable/recordable memory, and, for example, an EEPROM is used thereas. Constants, programs, and the like for the operation of the control unit 101 are recorded in the nonvolatile memory 106. In this case, the programs are those for executing various types of flowcharts to be described later in this embodiment.

A work memory 107 is used as a work area where constants and variables for the operation of the control unit 101, programs read out from the nonvolatile memory 106, and the like are loaded. The work memory 107 is also used as a buffer memory for temporarily holding the image data captured by the image capturing unit 103 or an image display memory for a display unit 109.

An operation unit 108 is an operation member such as various types of switches and buttons and a touch panel, which accept various types of operations from the user, and the operation unit 108 includes, for example, operation members 112 to 118, as shown in FIG. 1B. The configuration of each of the operation members 112 to 118 will be described later. The control unit 101 performs control such as communication with an external apparatus, shooting of an image, display, and reproduction, based on an instruction from the operation unit 108 in accordance with a user operation. The control unit 101 also executes transfer processing of a reproduced image and a shot image, which will be described later. Furthermore, the control unit 101 also performs control of a transfer management list used for the transfer processing of the present embodiment, and the like.

The display unit 109 displays a live view image at the time of shooting preparation, a shot image, and characters for a dialogical operation. The display unit 109 is, for example, a display device such as a liquid crystal display or organic EL display. The display unit 109 may be integrally formed with the image capturing apparatus 100 or may be an external apparatus connected to the image capturing apparatus 100.

The image processing unit 105 records an encoded image file in the recording medium 111, and the control unit 101 reads out an already recorded image file from the recording medium 111. The recording medium 111 may be a memory card, hard disk drive, or the like mounted in the image capturing apparatus 100, or a flash memory or hard disk drive built in the image capturing apparatus 100.

The communication unit 110 is an interface for communicably connecting to an external apparatus 200 such as a smartphone or a PC, which will be described later with reference to FIG. 2. The image capturing apparatus 100 of the present embodiment can give and receive data with an external apparatus 200 via the communication unit 110. For example, the control unit 101 can transmit the image data generated by the image capturing unit 103 to the external apparatus 200 via the communication unit 110. In the present embodiment, the communication unit 110 includes an interface for communicating with an external apparatus using a so-called wireless LAN or WiMAX according to the IEEE 802.11 standard. The control unit 101 implements wireless communication with the external apparatus 200 by controlling the communication unit 110. Note that the communication method is not limited to the wireless LAN, and for example, Bluetooth, or the like can be used. Wired communication such as Ethernet® or USB (Universal Serial Bus) may also be used.

Here, a configuration of the operation unit 108 of the image capturing apparatus 100 of the present embodiment will be described with reference to FIG. 1B.

The operation unit 108 includes operation members in the form of push-buttons, such as an OK button 112, a set button 113, a reproduction button 114, a multi-controller 115, a shooting button 116, a rating button 118, and an enlarge button 117. Also, the operation members 112 to 118 may be in the form of touch-buttons provided on a touch panel that is formed integrally with the display unit 109.

The OK button 112 is an operation member that sends an instruction for confirming items and settings selected by the user on a menu screen or the like to the control unit 101. For example, the OK button 112 is used to allow the user to determine in advance whether or not settings for which final confirmation by the user is needed, such as confirmation of images to be deleted and images to be transferred, are needed.

The set button 113 is an operation member that sends an instruction for setting items selected by the user on a menu screen or the like to the control unit 101. Although the set button 113 is a button that is used for user selection similarly to the OK button 112, the set button 113 is used for more general-purpose selection operations, such as when the user selects an item, an image, or the like on the menu screen or the like.

The reproduction button 114 is an operation member that sends an image reproduction instruction (an instruction to transition to a reproduction mode) to the control unit 101. In response to the reproduction button 114 being pushed, the control unit 101 can perform reproduction processing in which image data recorded in the recording medium 111 is read out, the image data is temporarily held in the work memory 107, and the image data is displayed on the display unit 109.

The multi-controller 115 is an operation member that includes up, down, left, and right cross keys and according to which the user sends an instruction for selecting an item or an image on the menu screen or the like to the control unit 101. The user moves a cursor to a predetermined position by pressing the up, down, left, and right keys of the multi-controller 115, and the user can select a desired item or image by pressing the set button 113.

The shooting button 116 is an operation member such as a shutter release button or a recording start button by which the user sends an instruction to start shooting to the control unit 101. In response to the shooting button 116 being pressed, the control unit 101 starts a series of processes for shooting an image, performing quick review of the image immediately after shooting, and writing the image in the recording medium 111, in accordance with a program stored in the nonvolatile memory 106.

The rating button 118 is an operation member that sends an instruction to give a rating to an image being reproduced to the control unit 101. In response to the rating button 118 being pressed while an image is being reproduced, the control unit 101 gives a rating to the image being reproduced.

The enlarge button 117 is an operation member that sends an instruction to perform enlarged display of an image being reproduced to the control unit 101. In response to the enlarge button 117 being pressed while an image is being reproduced, the control unit 101 enlarges the image being reproduced.

Next, a system configuration of the present embodiment will be described with reference to FIG. 2.

Figure 2:
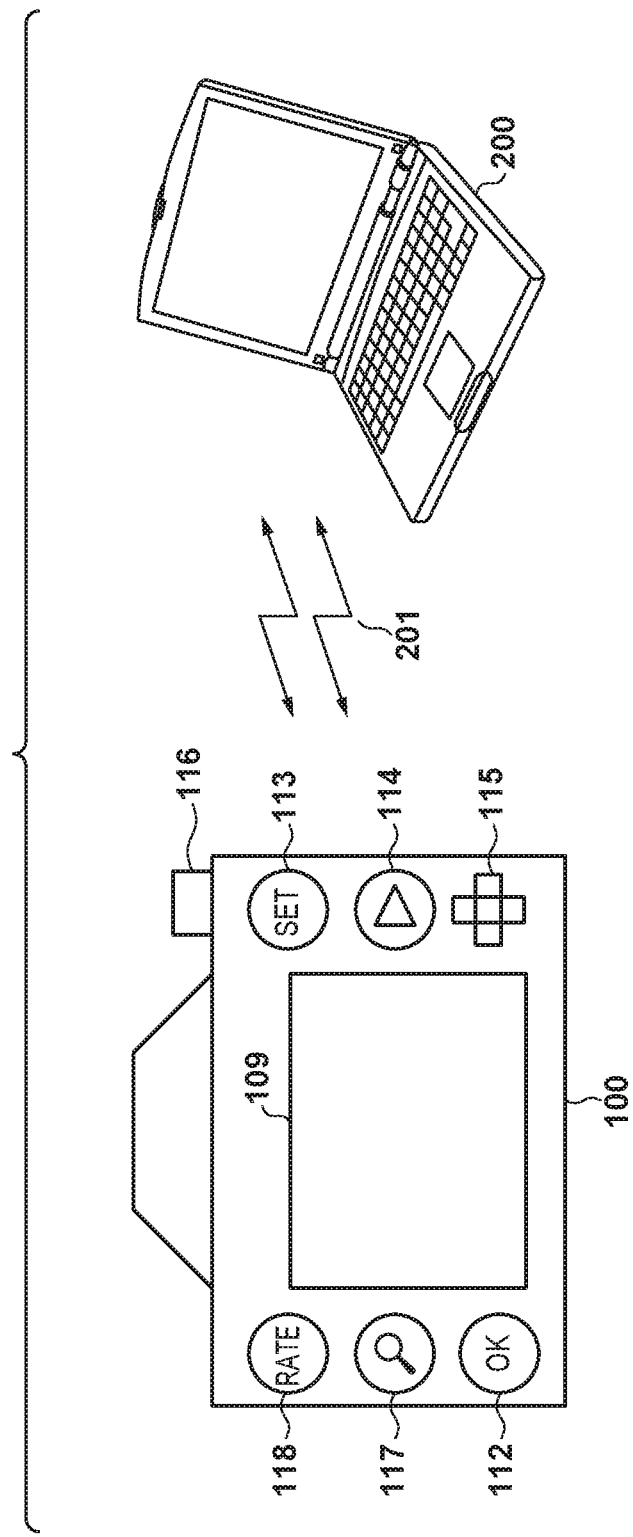
FIG. 2 is a diagram showing a system configuration of the present embodiment.

In FIG. 2, in the system of the present embodiment, the above-described image capturing apparatus 100 is connected to an external apparatus 200 that is an image transfer destination, such as a smartphone or a server computer (PC), via a network 201 for performing wireless communication or wired communication, and the above-described image capturing apparatus 100 transfers a shot image. Similarly to the image capturing apparatus 100, the external apparatus 200 includes a control unit, a work memory, a nonvolatile memory, an image processing unit, a communication unit, a display unit, an operation unit, a recording medium, and the like, although this is not shown in the drawings. There is no particular limitation on the communication method of the network 201 as long as it is possible to transmit data such as images between apparatuses. In the present embodiment, data transmission based on FTP (File Transfer Protocol), which is one technique used in a media business such as a television station or a newspaper company, is envisioned as a use case in which an image is transferred from the image capturing apparatus 100 to the external apparatus 200. In FTP, it is possible to use a function of automatically transferring images shot by the image capturing apparatus 100 and a function of starting image transfer by performing a predetermined operation during image reproduction. In particular, a case in which a photographer and an editor who processes the images are different at a big event such as the Olympics is envisioned, and in this circumstance, the shot images need to be transferred to the editor as soon as possible. Also, since the continuous shooting function and the like of the camera also have increased capabilities, a large amount of images are sometimes shot all at once, and in this kind of circumstance as well, it will be important to be able to select and transfer images to be transferred as quickly and as easily as possible.

Image Transfer Processing

Next, image transfer processing performed by the image capturing apparatus 100 of the present embodiment will be described with reference to FIGS. 3A to 3D.

Figure 3B:
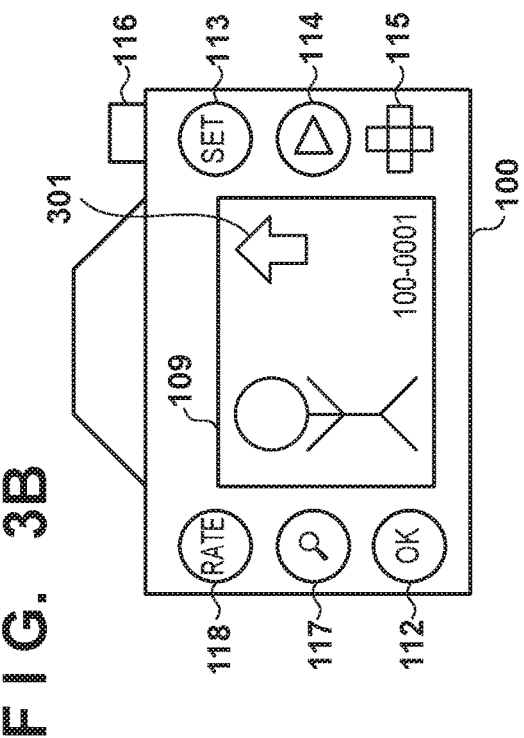
FIGS. 3A to 3D are diagrams for illustrating image transfer processing of the present embodiment.
Figure 3D:
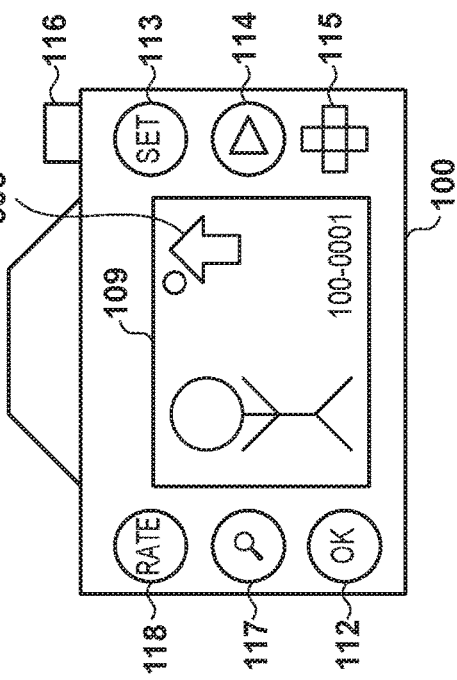
Figure 3A:
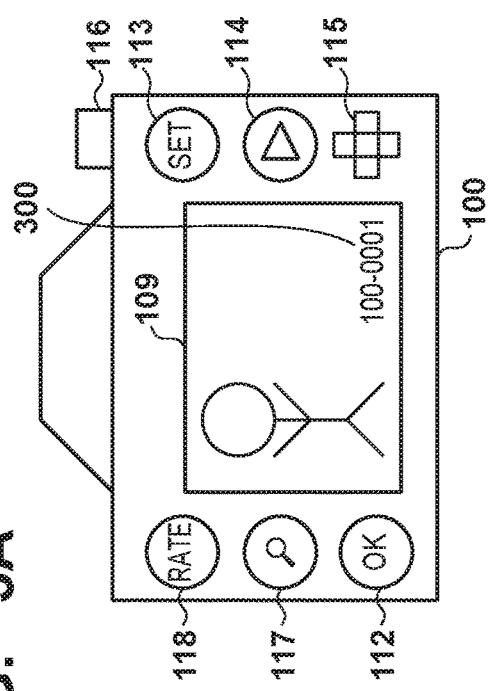

FIG. 3A illustrates a display state of the display unit 109 during image reproduction. In response to the reproduction button 114 being pressed, the control unit 101 reads out the image data recorded in the recording medium 111 and displays the image data on the display unit 109, while at the same time displaying image-related information such as a file name 300 of the image currently being displayed. Also, in the present embodiment, when a simultaneous press state in which two specific buttons of the operation unit 108 are pressed simultaneously during image reproduction is determined, the control unit 101 performs control such that the image currently being reproduced is designated as an image to be transferred. Various configurations for the allocation of the two buttons are conceivable, but normally, it is preferable to allocate a button that can be operated with the right hand and a button that can be operated with the left hand thereas. This is because the operation of pressing them simultaneously is easy for the photographer. For example, in a state in which the camera is set up in a landscape position, the two buttons are arranged on the left end side and the right end side on the rear surface of the camera body. In the present embodiment, the image to be transferred is designated in response to the OK button 112 and the set button 113 being pressed simultaneously. Note that it is also possible to use the rating button 118 or the enlarge button 117 instead of the OK button 112. Considering the workability of the buttons to be pressed simultaneously, buttons arranged on the left end and the right end on the rear surface of the camera body in a state in which the camera is set up in the landscape position have better workability, and the user easily operates these buttons.

FIG. 3B illustrates a state in which a first index 301 indicating that the image is the image to be transferred is displayed on the display unit 109, overlaid on the reproduced image. It is possible to clarify to the user that the reproduced image is to be transferred by thus displaying the first index 301, which indicates that the reproduced image is to be transferred. Also, if an image to be transferred exists as described above and the connection with the external apparatus that is the transfer destination has been established by the communication unit 110, the control unit 101 performs control such that the image to be transferred is transferred automatically.

Figure 3C:
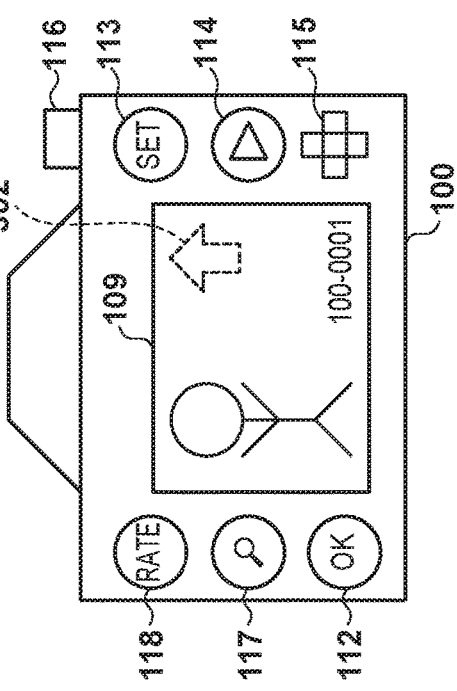

FIG. 3C illustrates a state in which the image to be transferred is being transferred. While the image is being transferred, a second index 302 displayed as a dotted line, which indicates that the reproduced image is being transferred is displayed on the display unit 109. In the example shown in the drawing, the icon display modes are different for the first index 301 and the second index 302, but the display modes may be the same or the color or the like may be changed. Also, the icon may blink. It is sufficient to clarify to the user that a change has been made from a state in which an image to be transferred has been selected and is awaiting transfer, to a state of undergoing transfer. FIG. 3D illustrates a state after the transfer of the image to be transferred is complete. After the transfer of the image is complete, a third index 303 indicating that the transfer of the image is complete is displayed on the display unit 109. Similarly to the second index 302 shown in FIG. 3C, which indicates that the image is undergoing transfer, the third index 303 need only be displayed with a different icon display mode, color, or the like. Note that when the OK button 112 and the set button 113 are pressed simultaneously while the image to be transferred is being reproduced, as shown in FIG. 3B, the control unit 101 cancels the designation of being an image to be transferred. In the present embodiment, simultaneous pressing of the OK button 112 and the set button 113 functions as a toggle button for switching whether or not to designate the image to be transferred.

Transfer Management List

Next, a transfer management list for managing images to be transferred will be described with reference to FIG. 4.

In FIG. 4, reference numeral 400 indicates an image of an image file recorded in the recording medium 111. Hereinafter, description will be given in correspondence to the states shown in FIGS. 3A to 3D, under the premise that three file names, namely IMG_0001, IMG_0002, and IMG_0003, exist as image-related information of the image files 400 recorded in the recording medium 111. In the state shown in FIG. 3A, the image IMG_0001 is displayed on the display unit 109. In this state, upon detecting simultaneous pressing of the OK button 112 and the set button 113, the control unit 101 adds a file name (IMG_0001) to the transfer management list 401 as image-related information of the image to be transferred, and the control unit 101 sets the transfer status, which indicates the transfer state of that image to "awaiting transfer". Then, as shown in FIG. 3B, the first index 301, which indicates an image to be transferred, is displayed on the display unit 109. Thereafter, when a switch is made while the image is being transferred as shown in FIG. 3C, the control unit 101 updates the transfer status of the image to be transferred (IMG_0001) in the transfer management list 402 to "undergoing transfer". Thereafter, when the transfer of the image is complete as shown in FIG. 3D, the control unit 101 updates the transfer status of the image to be transferred (IMG_0001) in the transfer management list 403 to "transfer complete". Here, control of the transfer management list in the case where one image file is selected as a file to be transferred and the image awaits transfer, undergoes transfer, and completes transfer has been described, but it is also possible to add multiple images to be transferred to the transfer management list in advance, as indicated by reference numeral 404. In this case, in response to the OK button 112 and the set button 113 being pressed simultaneously each time the reproduced image is switched, images to be transferred are sequentially added as in the transfer management list 404. Then, the transfer statuses are updated each time the images to be transferred await transfer, undergo transfer, and complete transfer. The transfer management list is recorded in the nonvolatile memory 106 and the recording medium 111 and is loaded to the work memory 107 when the control unit 101 uses it.

Note that "awaiting transfer", "undergoing transfer", and "transfer complete" are transfer statuses of the images to be transferred, and "awaiting priority transfer", "undergoing transfer", and "undergoing priority transfer" are statuses of later-described images to be priority transferred.

Although processing for transferring the reproduced images has been described in the description above, processing for automatically transferring shot images will also be described. The image capturing apparatus 100 of the present embodiment allows the user to select whether or not to transfer shot images in advance using the menu screen or the like, and includes a function of automatically transferring the shot images to a transfer destination in the case where the shot images are set to be automatically transferred. In this case as well, automatic transfer during shooting is realized by adding the shot images to the transfer list in the order they are shot, similarly to the reproduced images.

In the above-described reproduction processing and shot image transfer processing, the images to be transferred are transferred in the sequence in which they are registered in the transfer management list, but in this case, it is convenient to be able to allow images that are later in the transfer sequence and images that have not been set as images to be transferred to be transferred with priority by allowing them to interrupt those that are earlier in the transfer sequence. This kind of function is especially useful in a use case in which the images need to be transferred as soon as possible. In view of this, in the present embodiment, a technique is realized in which images to be transferred can be selected and transferred quickly with a simple operation, with the existing button arrangement of the camera as-is in order to prevent the original workability from being impaired.

Hereinafter, priority transfer processing of the present invention will be described with reference to FIGS. 5A to 5E to FIGS. 8A to 8D.

Priority Transfer Processing During Image Reproduction

Figure 5A:
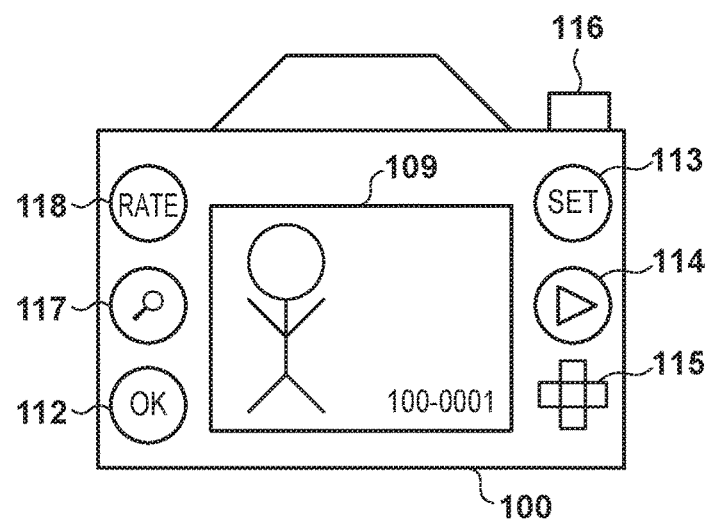
FIGS. 5A to 5E are diagrams showing a display example in the case of performing priority transfer processing at a time of image reproduction according to Embodiment 1.
Figure 5B:
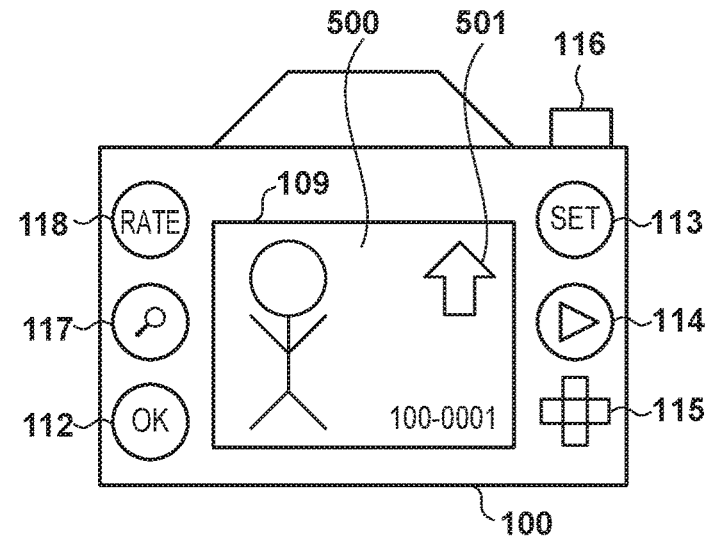

FIGS. 5A to 5E show display examples in the case of performing priority transfer at a time of image reproduction. The designation of the images to be transferred during reproduction in FIG. 5A and during reproduction in FIG. 5B is as described with reference to FIGS. 3A and 3B. If the OK button 112 and the set button 113 continue to be pressed simultaneously for a predetermined amount of time or more during the reproduction of images 500 to be transferred as shown in FIG. 5B, the control unit 101 sets the images 500 to be transferred during reproduction as images to be priority transferred.

Figure 5C:
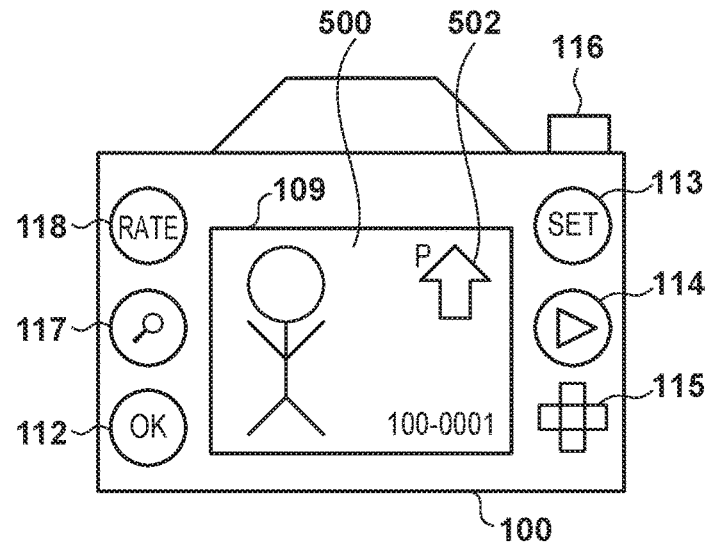

FIG. 5C illustrates a state in which the image 500 to be transferred is set as an image to be priority transferred due to the OK button 112 and the set button 113 being long-pressed simultaneously in the state shown in FIG. 5B. In the state shown in FIG. 5C, the image-related information (file name) of the image 500 to be transferred is moved to the top of the transfer management list and its transfer status is updated to "awaiting priority transfer". Also, a fourth index 502 indicating that the relevant image has been set as an image to be priority transferred is displayed overlaid on the image 500 to be transferred on the display unit 109. The fourth index 502 is displayed in a form and color different from that of the icon of the first index 501 so that it can be identified from the first index 501, and thus it is clarified to the user that the image 500 to be transferred is an image to be priority transferred. In the example shown in the drawing, the icon display modes are different for the first index 501 and the fourth index 502, but the icon display modes may be the same or the color or the like may be changed. It is sufficient to clarify to the user that a change has been made from being an image to be transferred to being an image to be priority transferred.

Figure 5D:
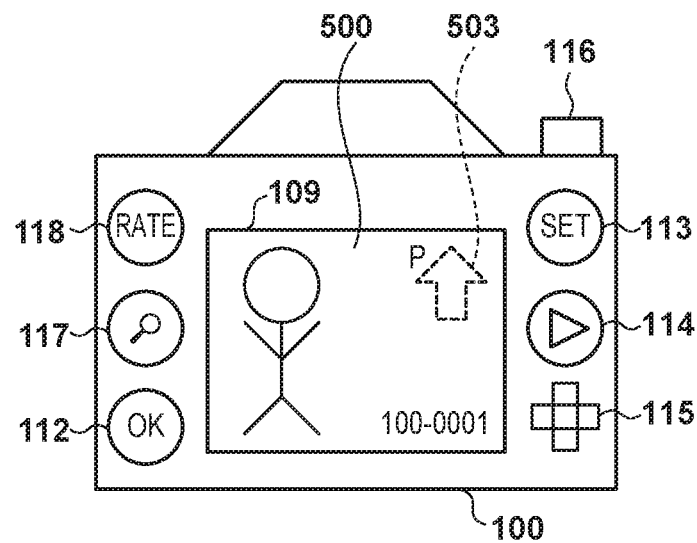

FIG. 5D illustrates a state in which the image to be priority transferred is being transferred. In the state shown in FIG. 5D, the transfer status of the image 500 to be transferred is updated to "undergoing priority transfer", and a fifth index 503 indicating that the image to be priority transferred is undergoing transfer is displayed on the display unit 109. In the example shown in the drawing, the icon display modes are different for the fourth index 502 and the fifth index 503, but the icon display modes may be the same or the color or the like may be changed. It is sufficient to clarify to the user that a change has been made from a state in which an image to be priority transferred has been selected, to a state of undergoing transfer.

Figure 5E:
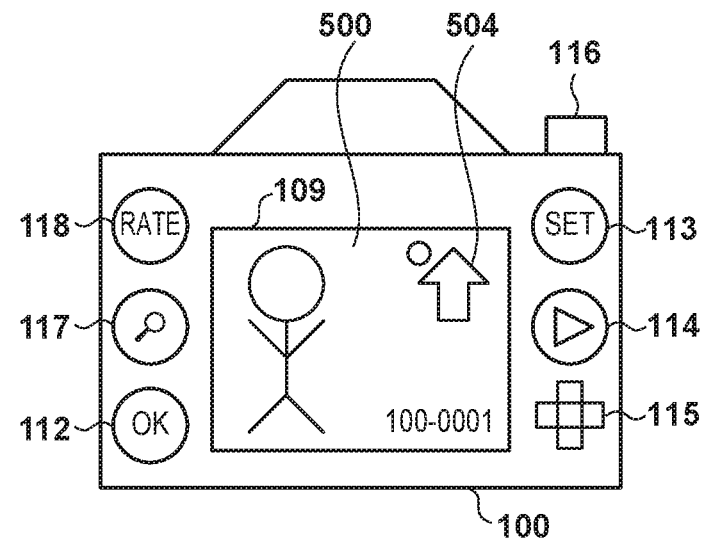

FIG. 5E illustrates a state after the transfer of the image to be priority transferred is complete. In the state shown in FIG. 5E, the transfer status of the image 500 to be transferred is updated to "priority transfer complete", and a sixth index 504 indicating that the transfer of the image is complete is displayed on the display unit 109. Note that although it is not necessary to make a particular distinction from the normal icon for an image that has completed transfer, display that is different from normal may be used to clarify to the user that priority transfer is complete. Similarly to the fifth index 503 shown in FIG. 5D, which indicates that the image is undergoing transfer, the sixth index 504 need only be displayed with a different icon display mode, color, or the like. Note that when the OK button 112 and the set button 113 are pressed simultaneously in the state of being set as an image to be priority transferred as shown in FIG. 5C, the control unit 101 cancels the setting of priority transfer.

Here, a method for setting an image to be priority transferred that is different from that shown in FIGS. 5A to 5E will be described. After an image to be transferred is designated as shown in FIG. 5B and the first index 501 is displayed on the display unit 109, the image 500 to be transferred can be set as an image to be priority transferred by releasing the OK button 112 and the set button 113 and pressing the OK button 112 or the set button 113 within a predetermined time period. Note that in this setting method, after the image to be transferred is designated by simultaneously pressing the OK button 112 and the set button 113, the image to be priority transferred is set by once again pressing either button within a predetermined time period. Here, it is possible to use not only a temporal restriction such as pressing within a predetermined time period, but also a condition that the button is pressed within a period before the display unit 109 is turned off and a shooting standby state is transitioned to, for example. Also, the period may be a period before the next image is reproduced.

Priority Transfer During Image Shooting

Figure 6A:
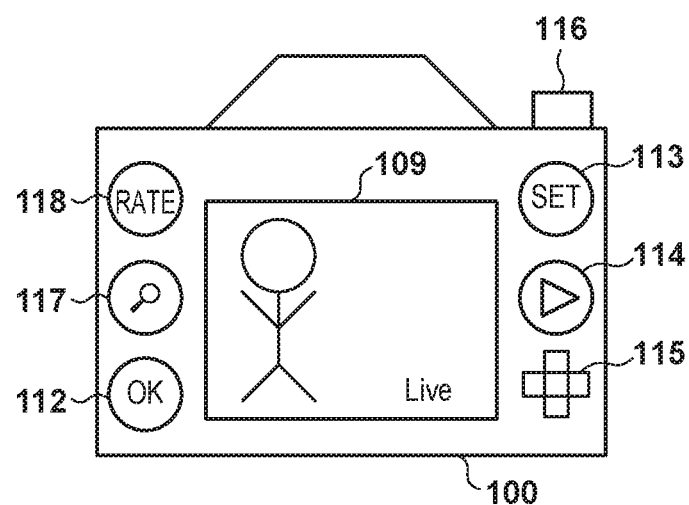
FIGS. 6A to 6C are diagrams showing a display example in the case of performing priority transfer processing at a time of image shooting according to Embodiment 1.
Figure 6B:
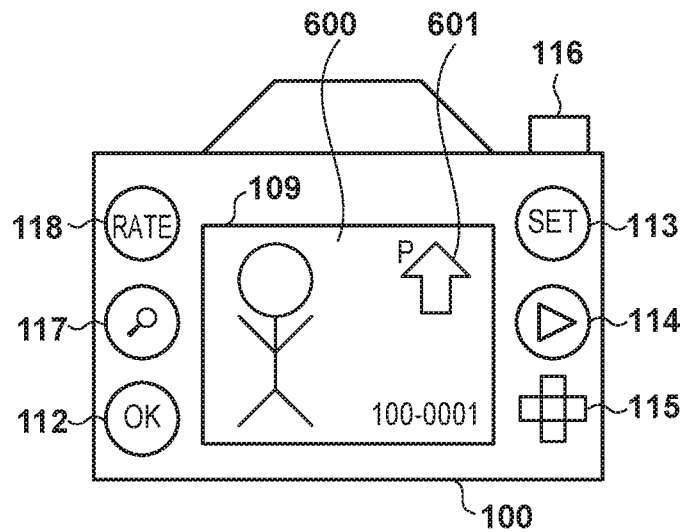
Figure 6C:
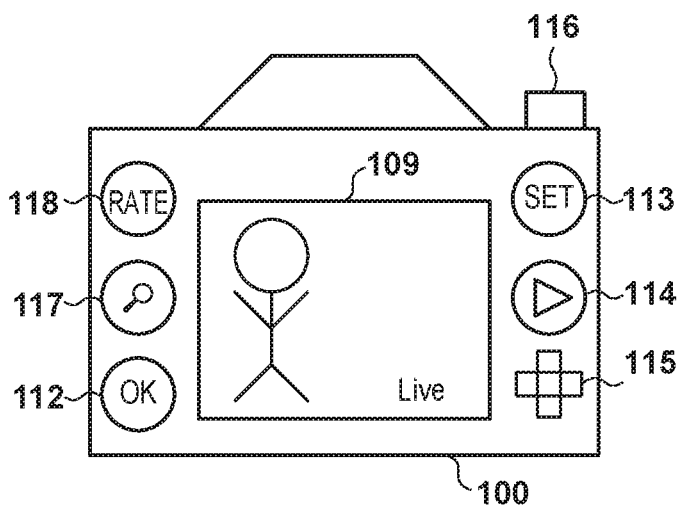

FIGS. 6A to 6C show display examples in the case of performing setting of an image to be priority transferred during image shooting. FIG. 6A illustrates a shooting standby state in which live view images are sequentially displayed on the display unit 109. When the shooting button 116 is pressed in the shooting standby state, normal shooting processing is started. Here, a use case is envisioned in which the image to be shot at this time is to be transferred with greater priority than an existing image to be transferred. In view of this, in the present embodiment, considering this kind of use case, when the shooting button 116 is pressed in the state in which the OK button 112 is pressed in the shooting standby state shown in FIG. 6A, the one or more images shot thereafter can be set as images to be priority transferred. In this case, as with the present embodiment, better workability is achieved when the OK button 112 is arranged at a position at which it can be operated with the left hand, in contrast to the shooting button 116, which is operated with the right hand.

FIG. 6B illustrates a quick review state for checking an image immediately after shooting. Since the shot image 600 shown in FIG. 6B is an image that was shot with the OK button 112 pressed, it has already been set as an image to be priority transferred at the time of quick review. Accordingly, the fourth index 601 indicating that the image is an image to be priority transferred is displayed overlaid on the shot image 600 on the display unit 109. FIG. 6C shows a state when the shooting standby state is returned to after quick review. Although FIG. 6C shows a state of being included in the next shooting, the state shown in FIG. 6C is a state in which the control unit 101 continues the transfer of the shot images in the background in cooperation with the communication unit 110.

Priority Transfer During Quick Review

FIGS. 7A to 7D show display examples in the case of performing setting of images to be priority transferred during quick review. FIG. 7A shows a shooting standby state in which live view images are sequentially displayed on the display unit 109, similarly to FIG. 6A.

FIG. 7B illustrates a quick review state immediately after the shooting button 116 is pressed in the state shown in FIG. 7A and shooting processing is performed. Here, a use case is envisioned in which, when a shot image is checked in quick review, the checked image is to be transferred with greater priority than an existing image to be transferred. In view of this, in the present embodiment, considering this kind of use case, the shot image 700 undergoing quick review can be set as an image to be priority transferred by pressing the OK button 112 and the set button 113 during quick review shown in FIG. 7B.

FIG. 7C shows a state in which an image undergoing quick review has been set as an image to be priority transferred. The fourth index 701, which indicates that the shot image 700 undergoing quick review has been set as an image to be priority transferred, is displayed on the display unit 109. Similarly to FIG. 6C, FIG. 7D illustrates a state in which the shooting standby state is returned to after quick review, and shows a state in which the transfer of images continues in the background.

Figure 8B:
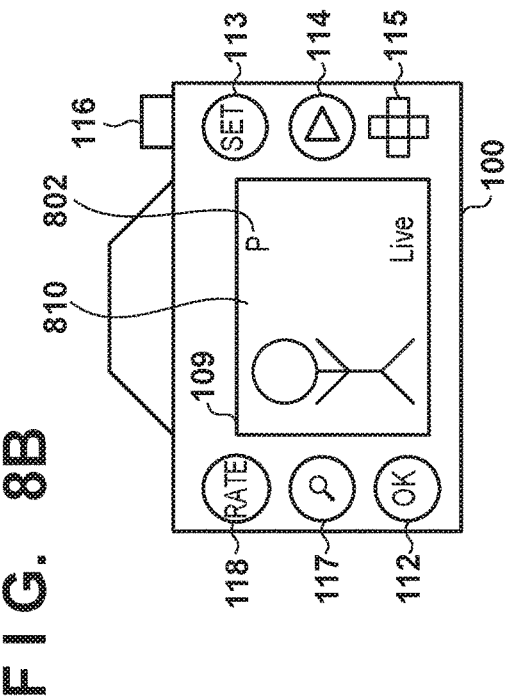
FIGS. 8A to 8D are diagrams showing a display example different from that of FIGS. 7A to 7D.
Figure 8D:
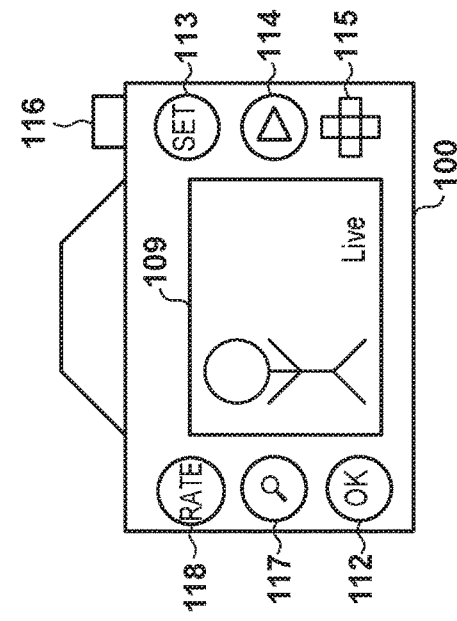
Figure 8A:
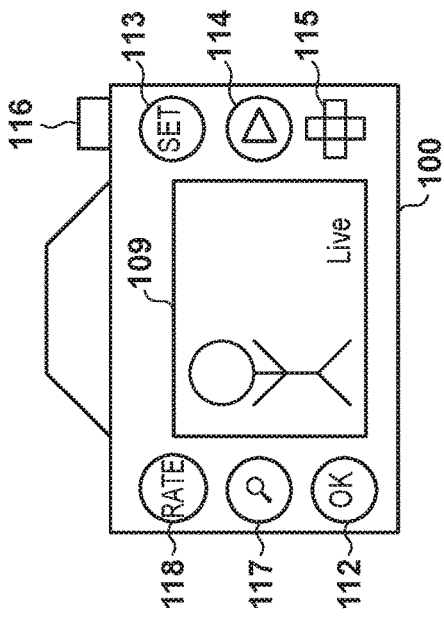

FIGS. 8A to 8D show display examples of an image to be priority transferred that is different from that shown in FIGS. 7A to 7D. FIG. 8A shows a shooting standby state similarly to FIG. 7A. When the OK button 112 and the set button 113 are pressed simultaneously in the shooting standby state shown in FIG. 8A, a seventh index 802 indicating that the image has been designated as an image to be transferred is displayed overlaid on the live view image 810 as in FIG. 8B. By pressing the shooting button 116 with the OK button 112 pressed in the state shown in FIG. 8B, the one or more images shot thereafter can be set as images to be priority transferred.

Figure 8C:
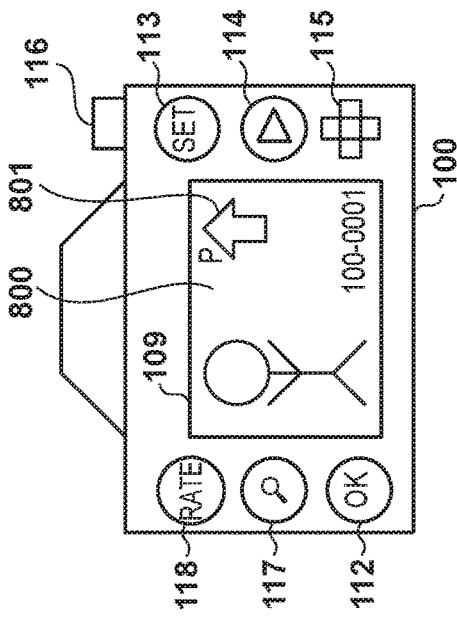

Similarly to FIG. 7B, FIG. 8C illustrates a quick review state for checking images immediately after shooting. The shot image 800 in FIG. 8C has already been set as an image to be priority transferred during quick review, and the fourth index 801 indicating that the image is an image to be priority transferred is displayed on the display unit 109. FIG. 8D shows a state when the shooting standby state is returned to after quick review. Although FIG. 8D shows a state of preparing for the next shooting, the state shown in FIG. 8D is a state in which the control unit 101 continues the transfer of the shot images in the background in cooperation with the communication unit 110. Note that since the shooting processing is complete in FIG. 8D, the fourth index 801 is removed.

Priority Transfer Processing During Image Reproduction

Figure 9A:
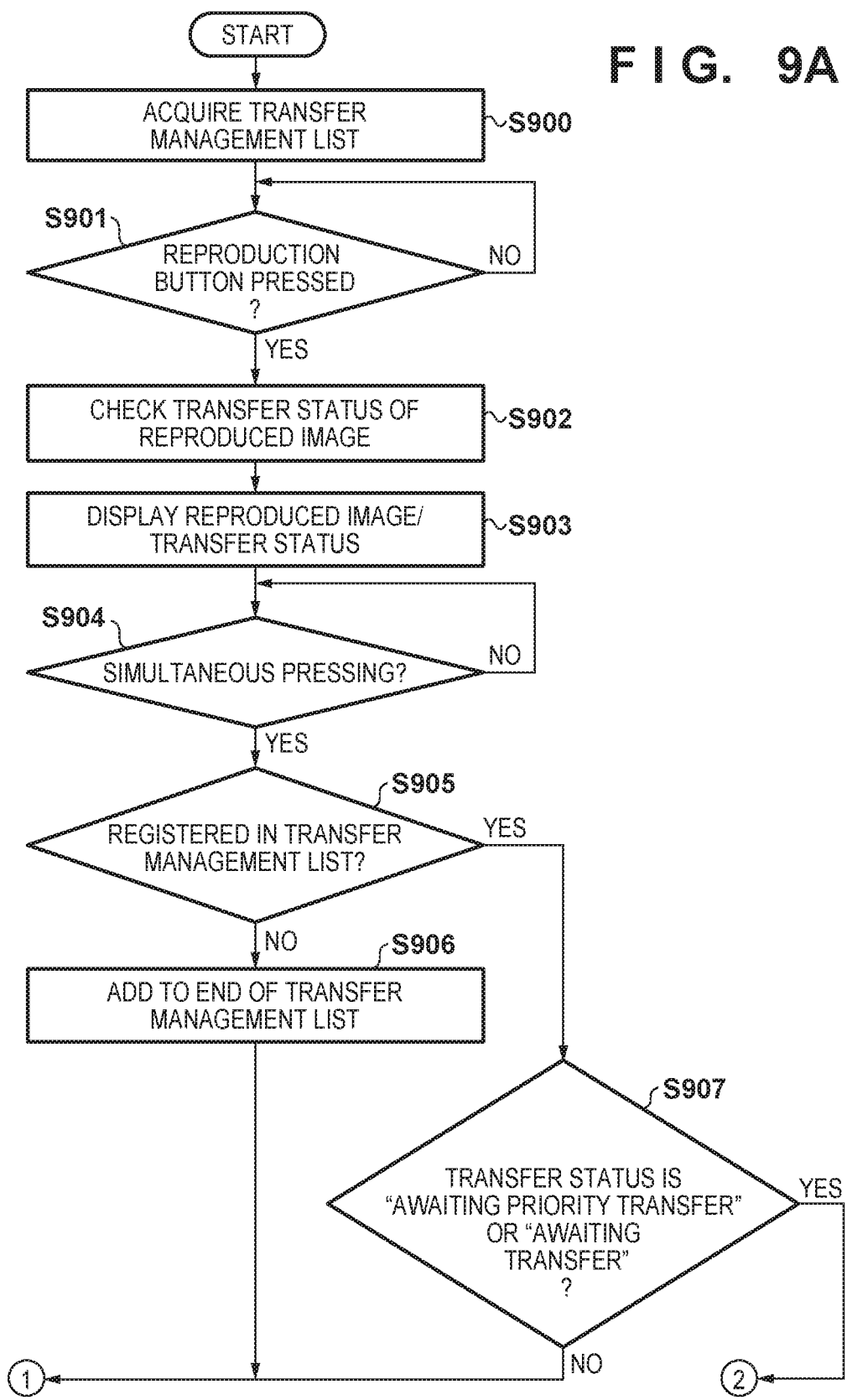
FIGS. 9A to 9C are flowcharts showing priority transfer processing at a time of image reproduction according to Embodiment 1.
Figure 9B:
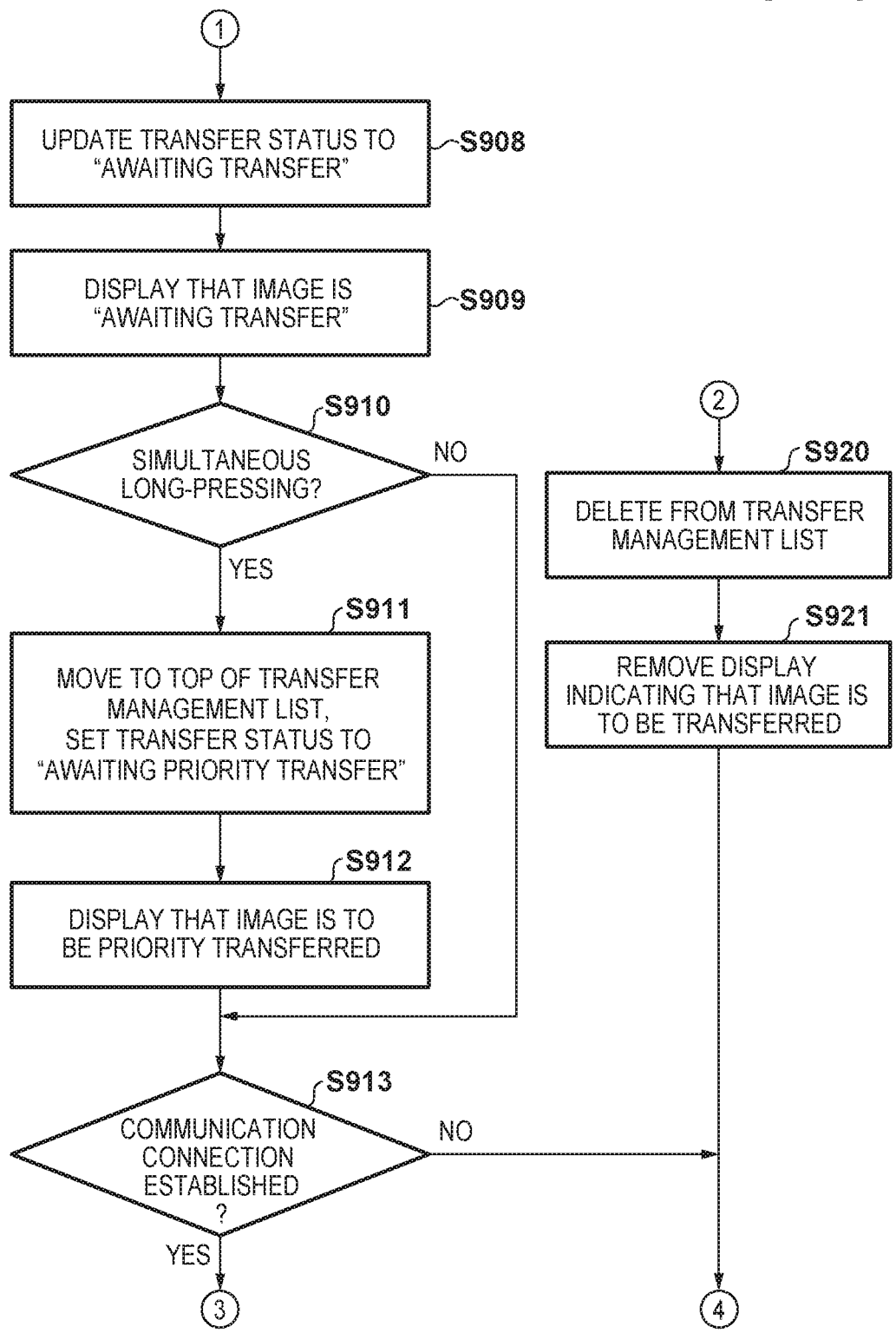
Figure 9C:
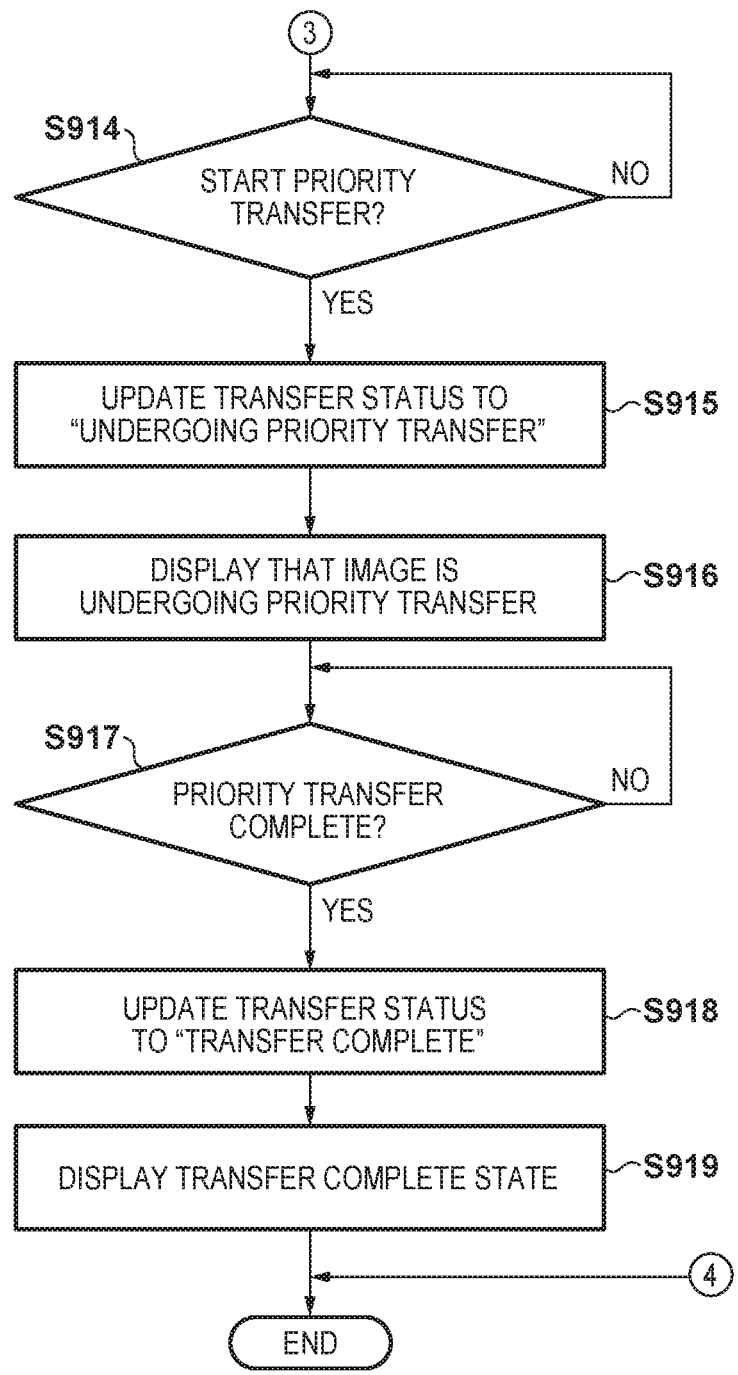

Next, processing for setting and transferring an image to be priority transferred during image reproduction by the image capturing apparatus 100 of the present embodiment will be described with reference to FIGS. 9A to 9C. Note that the processing shown in FIGS. 9A to 9C is realized due to the control unit 101 of the image capturing apparatus 100 loading a control program read out from the nonvolatile memory 106 to the work memory 107 and executing it. The same applies to FIGS. 10A, 10B, 11, 12, 13, and 15A to 15D, which will be described later.

In step S900, the control unit 101 acquires a transfer management list from the nonvolatile memory 106 or the recording medium 111. In step S901, the control unit 101 does not transition to the next processing but waits until it is determined that the reproduction button 114 is pressed, and if the reproduction button 114 is pressed, the control unit 101 advances to step S902.

In step S902, the control unit 101 checks the transfer status of the reproduced image using the transfer management list. As described with reference to FIG. 4, "awaiting transfer" or "awaiting priority transfer", "undergoing transfer" or "undergoing priority transfer", and "transfer complete" or "priority transfer complete" are the transfer statuses. In step S903, the control unit 101 displays the index corresponding to the transfer status checked in step S902 by overlaying it on the reproduced image on the display unit 109.

In step S904, the control unit 101 waits until it is determined that the OK button 112 and the set button 113 are pressed simultaneously, without transitioning to the next processing, and if it is determined that the OK button 112 and the set button 113 are pressed simultaneously, the control unit 101 advances to step S905. In step S905, the control unit 101 determines whether or not the image being reproduced exists in the transfer management list acquired in step S900, and if it does not exist in the transfer management list, the control unit 101 advances to step S906, and if it does exist, the control unit 101 advances to step S907.

In step S906, the control unit 101 adds the image-related information (file name) of the reproduced image to the end of the transfer management list and advances to step S908. In step S907, the control unit 101 checks whether or not the transfer status of the reproduced image registered in the transfer management list is "awaiting transfer" or "awaiting priority transfer", and if it is "awaiting transfer" or "awaiting priority transfer", the control unit 100 advances to step S920, and if not, the control unit 100 advances to step S908.

In step S920, the control unit 101 deletes the image-related information of the reproduced image from the transfer management list. In step S921, the control unit 101 removes display of the index indicating that the reproduced image is an image to be transferred and enters the state shown in FIG. 5A. Settings for a reproduced image that has already thus been set as an image to be transferred or an image to be priority transferred can be canceled by simultaneously pressing the OK button 112 and the set button 113 during reproduction.

In step S908, the control unit 101 updates the transfer status of the reproduced image to "awaiting transfer" in the transfer management list. In step S909, the control unit 101 displays an index indicating that the transfer status is "awaiting transfer" on the display unit 109 and enters the state shown in FIG. 5B.

In step S910, the control unit 101 determines whether or not the OK button 112 and the set button 113 are being long-pressed simultaneously, and if they are being long-pressed simultaneously, the control unit 101 advances to step S911 to set the image currently being displayed as an image to be transferred, and if not, the control unit 101 advances to step S913. In step S911, the control unit 101 moves the image-related information (file name) of the image currently being displayed to the top of the transfer management list and sets the transfer status to "awaiting priority transfer".

In step S912, the control unit 101 displays an index indicating that the image is an image to be priority transferred on the display unit 109 and enters the state shown in FIG. 5C. In step S913, the control unit 101 checks the state of communication with the external apparatus 200, which is the image transfer destination, by the communication unit 110, and if no connection with the external apparatus 200 has been established, the processing ends, and if a connection has been established, the control unit 101 advances to step S914.

In step S914, the control unit 101 waits until the transfer of the image to be transferred is started, without transitioning to the next processing, and when it is determined that the transfer has started, the control unit 101 advances to step S915. In step S915, the control unit 101 updates the transfer status in the transfer management list to "awaiting priority transfer".

In step S916, the control unit 101 displays an index indicating that the image is being priority transferred on the display unit 109, and enters the state shown in FIG. 5D. In step S917, the control unit 101 waits until priority transfer is complete without transitioning to the next processing, and when priority transfer is complete, the control unit 101 advances to step S918.

In step S918, the control unit 101 updates the transfer status in the transfer management list to "transfer complete". In step S919, the control unit 101 displays an index indicating that the transfer status is "transfer complete" on the display unit 109 and enters the state shown in FIG. 5E. When transfer of the image to be transferred is complete, the transfer of an image that is not an image to be priority transferred and whose transfer status is "awaiting transfer" is started.

According to the above-described priority transfer processing in FIGS. 9A to 9C, the setting of the image to be priority transferred can be performed quickly with a simple operation that can be performed continuously after the operation of designating the image to be transferred during image reproduction, and therefore it is possible to provide a means of accurately responding to the desire to transfer an image as quickly as possible.

Note that in FIG. 9B, a case in which the OK button 112 and the set button 113 are long-pressed simultaneously in step S910 is a condition for starting processing for setting and transferring an image to be priority transferred, but the combination of buttons and the method of operation are not limited to the above description. For example, a case in which the set button 113 is double-clicked (pressed twice in succession) with the OK button 112 pressed and a case in which the OK button 112 is double-clicked with the set button 113 pressed may be used as conditions. Also, a case in which the OK button 112 and the set button 113 are double-clicked simultaneously may be used as a condition.

Priority Transfer Processing During Quick Review

Next, processing for setting and transferring an image to be priority transferred during quick review by the image capturing apparatus 100 of the present embodiment will be described with reference to FIGS. 10A and 10B.

In step S1000, the control unit 101 acquires the transfer management list from the nonvolatile memory 106 or the recording medium 111. In step S1001, the control unit 101 waits until it is determined that the shooting button 116 is pressed, without transitioning to the next processing, and if it is determined that the shooting button 116 is pressed, the control unit 101 advances to step S1002.

In step S1002, it is determined whether or not the OK button 112 is being pressed when the shooting button 116 is pressed, and if the OK button 112 is not being pressed, the shooting processing is executed and the processing advances to step S1004, and if the OK button 112 is being pressed, the processing advances to step S1003. In step S1003, the control unit 101 performs shooting processing, moves the image-related information of the shot image to the top of the transfer management list, and sets its transfer status to "awaiting transfer".

In step S1004, the control unit 101 performs quick review display of the image shot in step S1003 on the display unit 109. In step S1005, the control unit 101 checks whether or not the image undergoing quick review display exists in the transfer management list acquired in step S1000, and if it does not exist, the processing advances to step S1008, and if it does exist, the processing advances to step S1006.

In step S1006, the control unit 101 acquires the transfer status of the image undergoing quick review from the transfer management list. In step S1007, the control unit 101 displays the index corresponding to the transfer status acquired in step S1006 by overlaying it on the image on the display unit 109.

In step S1008, the control unit 101 determines whether or not quick review is being continued, and if quick review is being continued, the processing advances to step S1009, and if quick review has ended, the processing ends. Here, a case in which a predetermined amount of time elapses from when the shot image is displayed and a case in which the user performs a predetermined operation are conceivable as conditions under which quick review is ended. In step S1009, the control unit 101 determines whether or not the OK button 112 and the set button 113 are pressed simultaneously, and if they have not been pressed simultaneously, the processing returns to step S1008, and if they are pressed simultaneously, the processing advances to step S1010.

In step S1010, the control unit 101 checks whether or not an image undergoing quick review exists in the transfer management list acquired in step S1000, and if it does not exist in the transfer management list, the processing advances to step S1011, and if it does exist, the processing advances to step S1012.

In step S1011, the control unit 101 adds the image-related information of the image undergoing quick review to the top of the transfer management list, sets its transfer status to "awaiting priority transfer", and advances to step S1016. In step S1016, the control unit 101 displays an index indicating that the image is an image to be priority transferred on the display unit 109 by overlaying it on the shot image, and enters the state shown in FIG. 7C. Thereafter, the processing returns to step S1008, and during quick review, the processing starting from step S1008 is performed repeatedly.

In step S1012, the control unit 101 uses the transfer management list to check whether or not the transfer status of the image undergoing quick review is "awaiting priority transfer", and if it is "awaiting priority transfer", the processing advances to step S1014, and if not, the processing advances to step S1013. In step S1013, the control unit 101 moves the image-related information of the image undergoing quick review to the top of the transfer management list, sets its transfer status to "awaiting priority transfer", and advances to step S1016.

In step S1014, after the transfer status of the image to be priority transferred changes from "awaiting transfer" to "transfer complete", the control unit 101 deletes the image-related information from the transfer management list. In step S1015, the control unit 101 removes the index indicating that the image is an image to be priority transferred from the display unit 109 and enters the state shown in FIG. 7B. Settings for the shot image thus set as an image to be priority transferred during shooting can be canceled by simultaneously pressing the OK button 112 and the set button 113 during quick review.

Figure 10A:
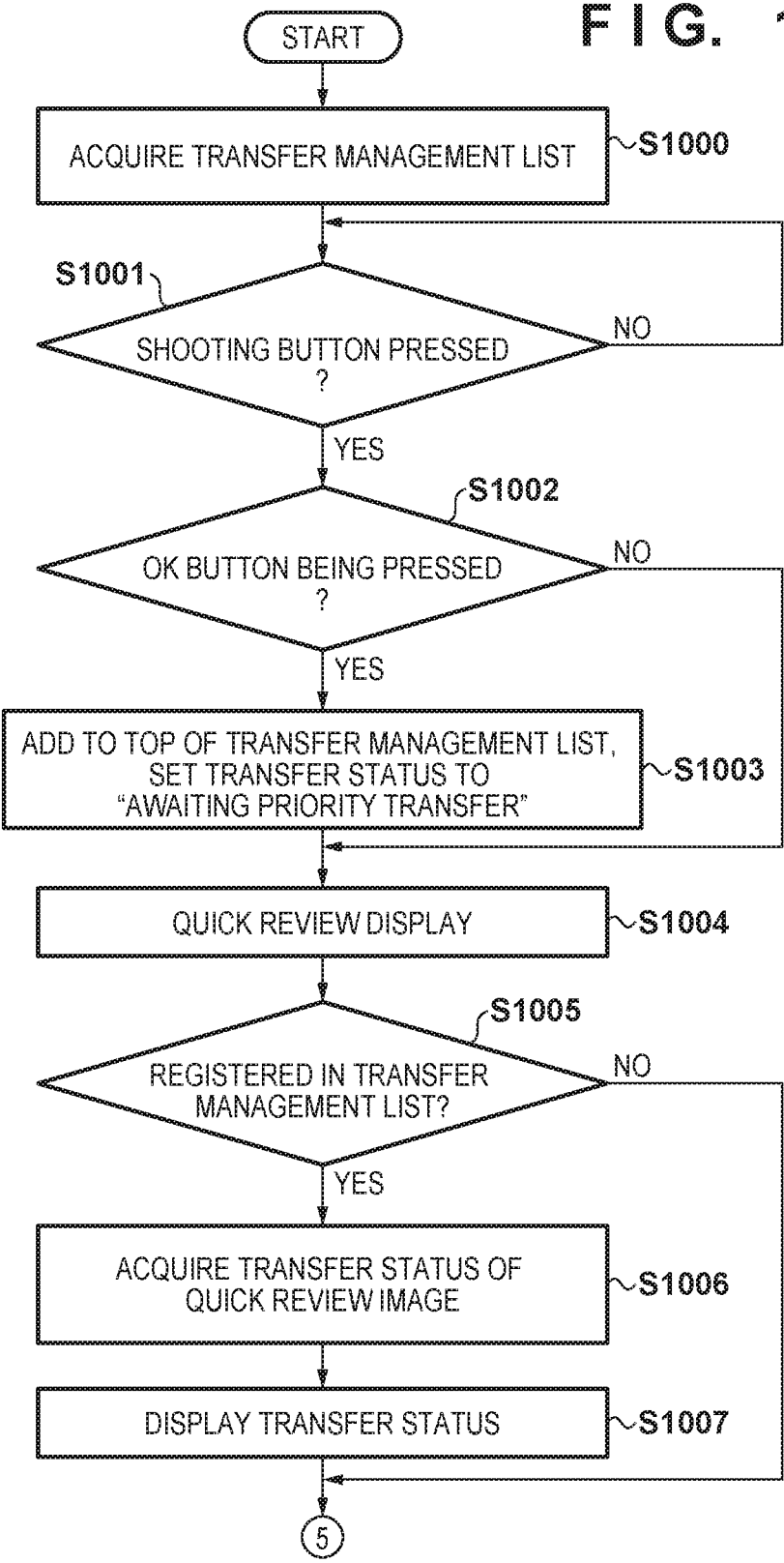
FIGS. 10A and 10B are flowcharts showing priority transfer processing at a time of image shooting and a time of quick preview according to Embodiment 1.
Figure 10B:
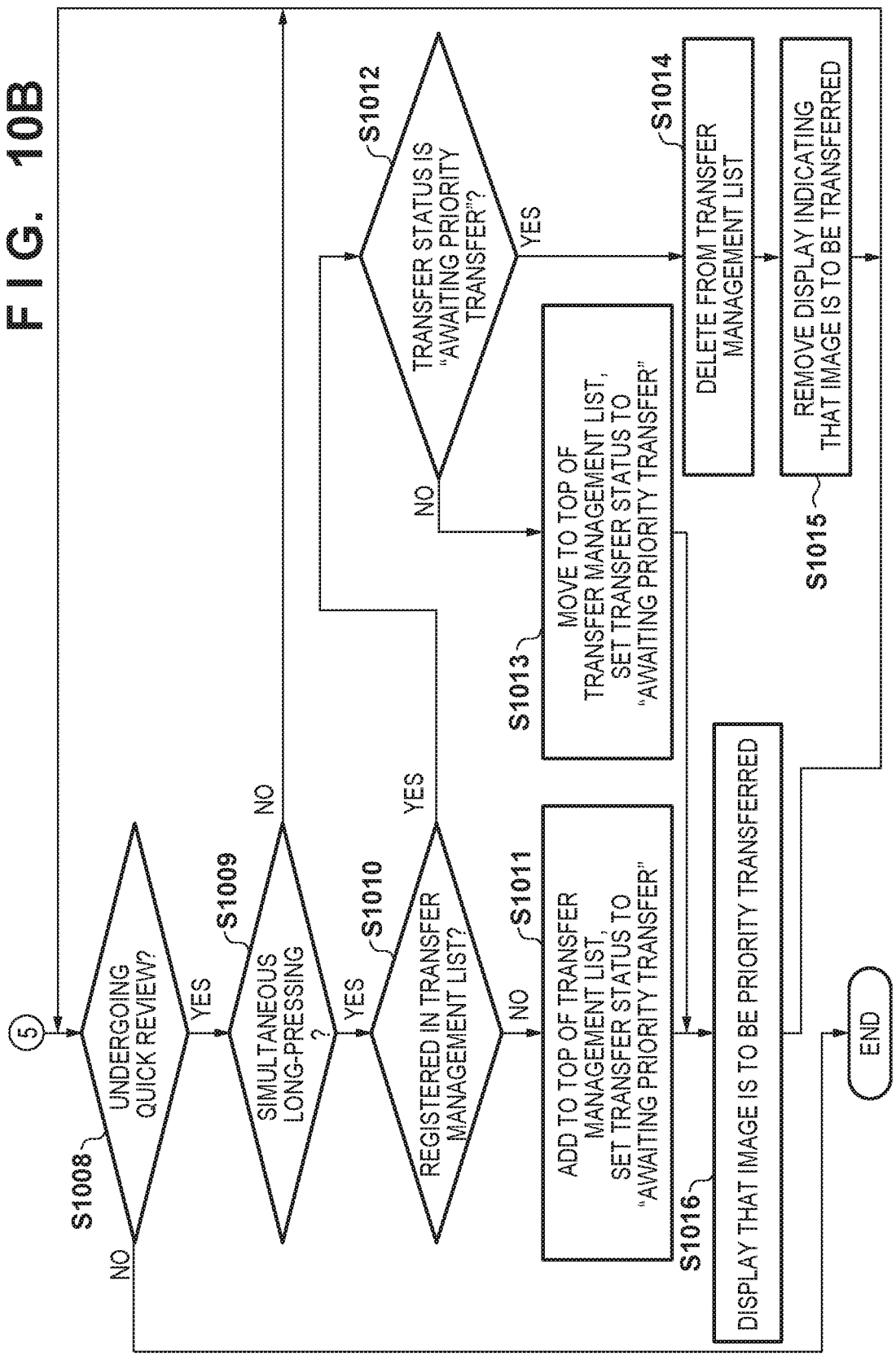

According to the priority transfer processing of the above-described FIGS. 10A and 10B, the setting of the image to be priority transferred can be performed quickly with a simple operation that can be performed at the same time as the shooting start instruction during image shooting. Accordingly, it is possible to provide a means of accurately responding to the desire to transfer an image as soon as possible.

Note that similarly to FIGS. 9A to 9C, if the connection with the external apparatus has been established, image transfer is started and the transfer status is set to "undergoing priority transfer", although this is not included in the flowchart shown in FIGS. 10A and 10B. Also, when image transfer is complete, the transfer status is set to "transfer complete". The same applies to FIGS. 11, 12, 13, and 15, which will be described later.

Also, in FIGS. 9A to 9C, 10A, and 10B, if the OK button 112 and the set button 113 are simultaneously pressed or simultaneously long-pressed, in steps S911, S1011, and S1013, control is performed such that the image-related information set for the image to be priority transferred is arranged at the top of the transfer management list. In contrast to this, it is possible to use a configuration in which the image to be priority transferred is added behind an existing image to be priority transferred if an image to be priority transferred already exists in the transfer management list. The important thing is that the image to be priority transferred is registered in the list so as to be transferred before other images to be transferred.

Embodiment 2

Next, Embodiment 2 will be described with reference to FIGS. 11 to 13.

In the above-described Embodiment 1, priority transfer processing during reproduction or shooting of a single image was described. In contrast to this, the present embodiment will describe priority transfer processing during continuous shooting in which multiple images are shot. FIG. 11 shows processing during image shooting.

In step S1100, the control unit 101 acquires the transfer management list from the nonvolatile memory 106 or the recording medium 111. In step S1101, the control unit 101 waits until it is determined that the shooting button 116 is pressed, without transitioning to the next processing, and if it is determined that the shooting button 116 is pressed, the control unit 101 advances to step S1102.

In step S1102, the control unit 101 determines whether or not continuous shooting is being executed with the shooting button 116 being pressed, and if it is determined that continuous shooting is being executed, the processing advances to step S1103, and if it is determined that single-shot shooting has been executed, the processing advances to step S1111. In step S1103, the control unit 101 determines whether or not the OK button 112 is being pressed simultaneously, and if the OK button 112 is being pressed, the processing advances to step S1105, and if it has not been pressed, the processing advances to step S1110.

In step S1104, the control unit 101 sets a flag for setting a series of images shot continuously as images to be priority transferred. In step S1105, with the control unit 101, image files are generated by the image processing unit 105 based on the image data obtained by continuous shooting.

In step S1106, after the flag is set, the control unit 101 sets all of the images that were continuously shot as images to be priority transferred. The control unit 101 adds the image-related information of all of the images that were continuously shot to the top of the transfer management list, sets the transfer status to "awaiting priority transfer", and advances to step S1107.

In step S1107, the control unit 101 determines whether or not the OK button 112 has continued to be pressed, and if the OK button 112 has continued to be pressed, the processing advances to step S1108, and if not, the processing advances to step S1109. Regardless of whether the OK button 112 is being pressed or not, the continuously-shot images generated in step S1105 are set as images to be priority transferred.

In step S1108, the control unit 101 determines whether or not the shooting button 116 has been continued to be pressed, and if the shooting button 116 has been continued to be pressed, the continuous shooting is continuing, and therefore the processing returns to step S1105, and if the shooting button 116 has not been continued to be pressed, the continuous shooting has ended, and therefore the processing advances to step S1109.

In step S1109, the control unit 101 resets the flag set in step S1104. In step S1110, the control unit 101 performs quick review display of the shot images. In step S1111, the control unit 101 determines whether or not the OK button 112 is being pressed, and if the OK button 112 is being pressed, the processing advances to step S1112, and if the OK button 112 is not being pressed, the processing advances to step S1110 and shooting processing for a single image that was not shot continuously is executed.

In step S1112, the control unit 101 sets the single-shot image as an image to be priority transferred. The control unit 101 adds the image-related information of the single-shot image to the top of the transfer management list, sets the transfer status to "awaiting priority transfer", and advances to step S1110.

Figure 11:
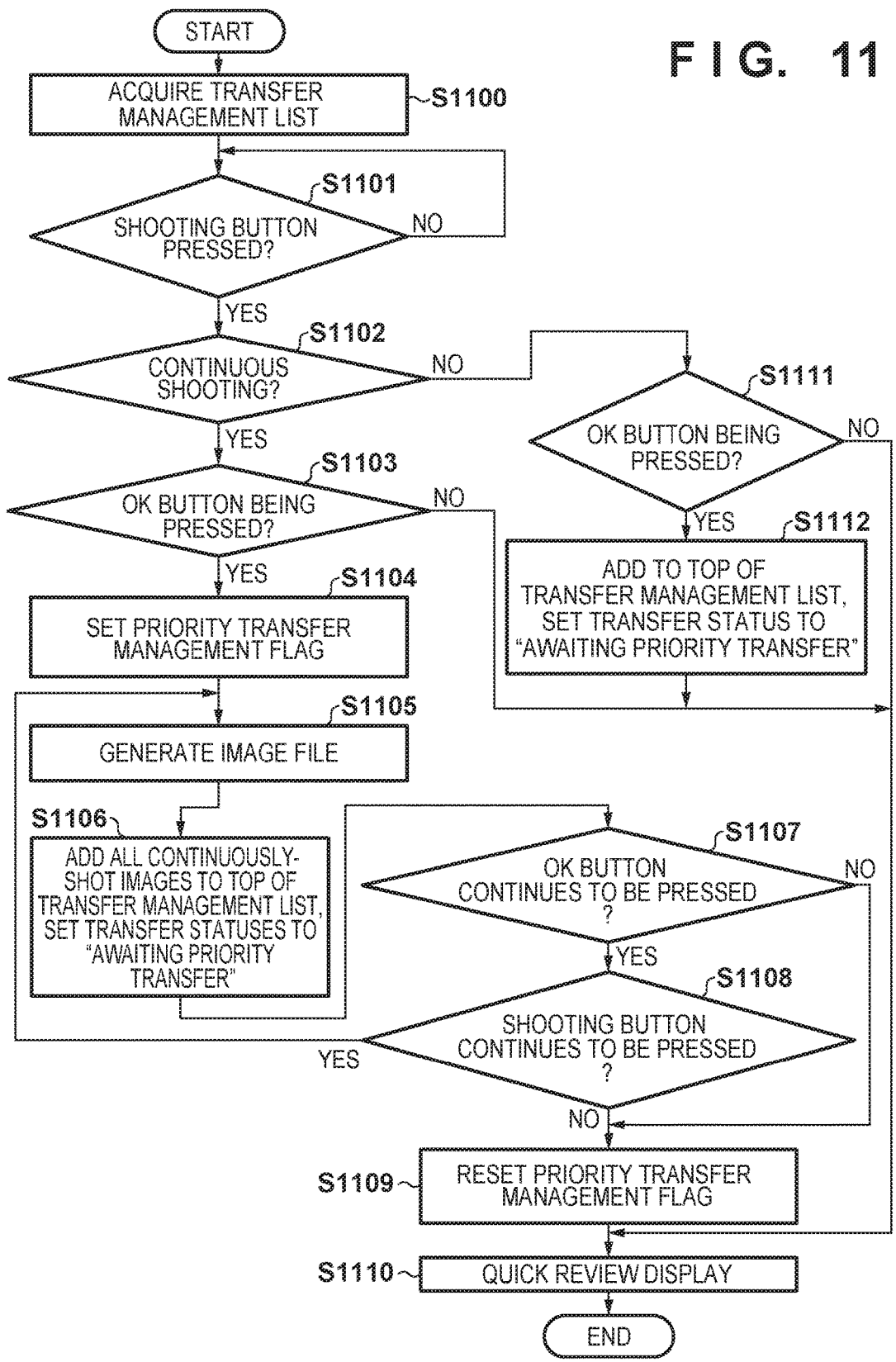
FIG. 11 is a flowchart showing priority transfer processing at a time of continuous shooting according to Embodiment 2.

According to the priority transfer processing of the above-described FIG. 11, the setting of the image to be priority transferred can be performed quickly with a simple operation that can be performed during an operation for continuous shooting, and therefore it is possible to provide a means for accurately responding to a desire to transfer an image as quickly as possible. For example, such a means may be useful in a case in which it is better to transfer all shot images and have them be selected at the transfer destination instead of having the photographer at the transfer source select the images to be transferred. Also, a photographer can transfer continuously shot images with priority with minimal labor in the case where there is no time to check the continuously shot images and check which images are to be transferred with priority when images are shot continuously, such as a case requiring urgency. The merit of these is particularly prominent in a use case in which speedy reporting is required and the transfer destination has greater access to resources for image checking and editing, as with the relationship between a cameraman and a news station.

Figure 12:
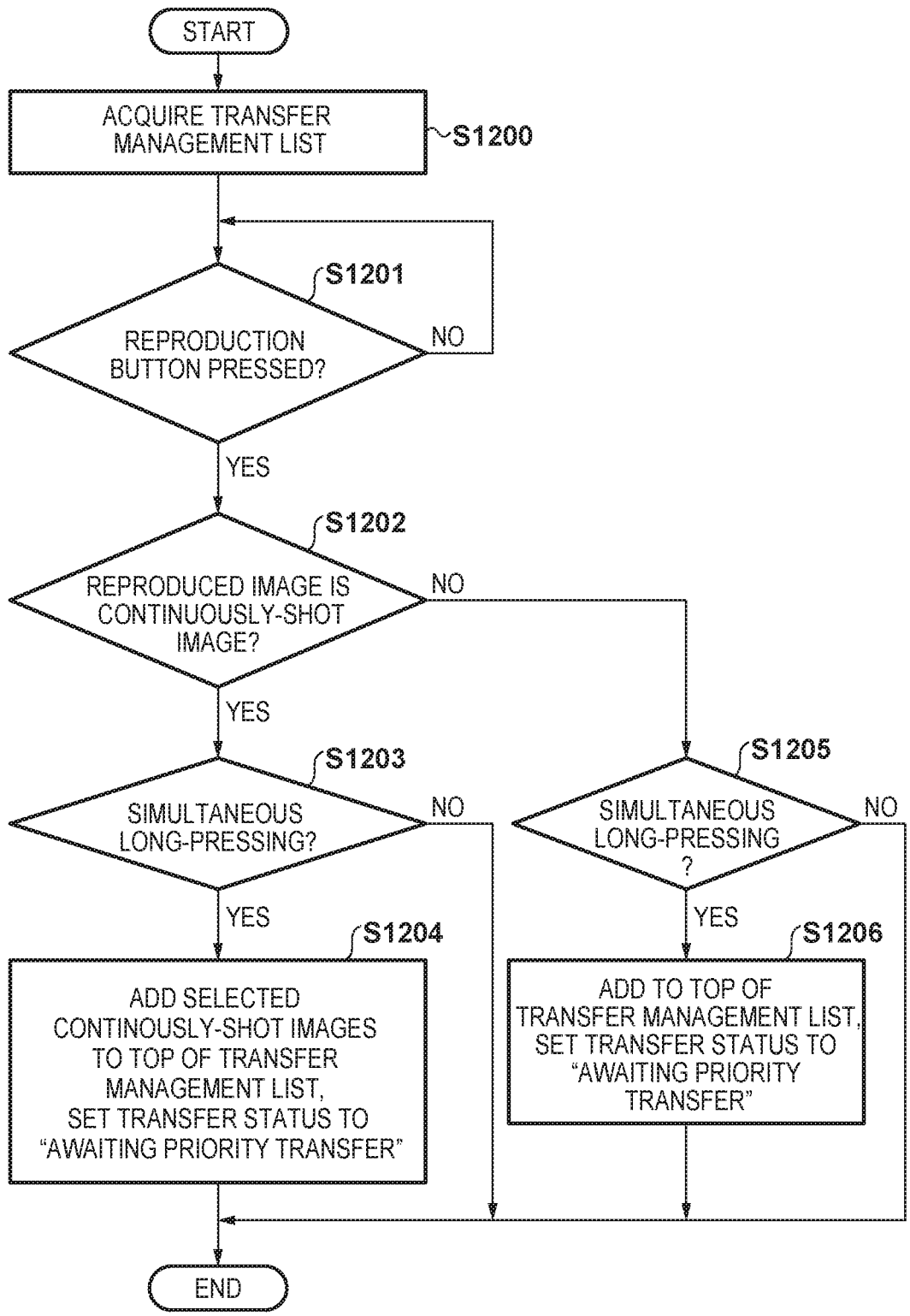
FIG. 12 is a flowchart showing priority transfer processing at a time of image reproduction according to Embodiment 2.

FIG. 12 shows processing during reproduction of continuously-shot images.

In step S1200, the control unit 101 acquires the transfer management list from the nonvolatile memory 106 or the recording medium 111. In step S1201, the control unit 101 waits until it is determined that the reproduction button 114 is pressed, without transitioning to the next processing, and if it is determined that the reproduction button 114 is pressed, the control unit 101 advances to step S1202.

In step S1202, the control unit 101 determines whether or not the reproduced image is part of images shot continuously, and if it is determined that the reproduced image is an image that was shot continuously, the processing advances to step S1203, and if it is determined that the reproduced image is a single-shot image, the processing advances to step S1205. The control unit 101 determines whether or not the reproduced image is part of continuously-shot images based on identification information added to the meta data of the continuously-shot images.

In step S1203, the control unit 101 determines whether or not the OK button 112 and the set button 113 are being long-pressed simultaneously. Then, if they are being long-pressed simultaneously, the processing advances to step S1204 so that the selected continuously-shot images are set to be images to be priority transferred through simultaneous long-pressing, and if not, the processing ends.

In step S1204, the control unit 101 moves the image-related information of only the images selected from among all of the continuously-shot images to the top of the transfer management list and sets the transfer status to "awaiting priority transfer" Although various methods are conceivable for selecting the images to be priority transferred, for example, it is conceivable to set the images to be transferred by long-pressing a button each time the continuously-shot images are reproduced, similarly to the designation of the images to be transferred in FIGS. 9A to 9C.

In step S1205, the control unit 101 determines whether or not the OK button 112 and the set button 113 are being long-pressed simultaneously, and if they are being long-pressed simultaneously, the processing advances to step S1206 so that the reproduced image is set as an image to be priority transferred, and if not, the processing ends.

In step S1206, the control unit 101 moves the image-related information of the reproduced image to the top of the transfer management list and sets the transfer status to "awaiting priority transfer".

According to the above-described priority transfer processing of FIG. 12, setting of the images to be priority transferred can be performed quickly with a simple operation during reproduction of continuously-shot images, and only images selected from among the continuously-shot images can be transferred in a thinned-out manner. Accordingly, the images that the photographer, who is the transfer source, wishes to transfer can easily be excluded or selected and transferred.

Next, a modified example of Embodiment 2 will be described with reference to FIG. 13.

The present embodiment is a modified example of the above-described processing of FIG. 11, and is processing in which information associated with the continuously-shot images is added during continuous shooting, and all of the continuously-shot images are set as images to be priority transferred when the OK button 112 is pressed during continuous shooting. FIG. 13 shows priority transfer processing during image shooting.

In step S1300, the control unit 101 acquires the transfer management list from the nonvolatile memory 106 or the recording medium 111. In step S1301, the control unit 101 waits until it is determined that the shooting button 116 is pressed, without transitioning to the next processing, and if it is determined that the shooting button 116 is pressed, the control unit 101 advances to step S1302.

In step S1302, with the control unit 101, image files are generated by the image processing unit 105 based on the image data obtained by shooting. If the generated image is a continuously-shot image, the control unit 101 adds information according to which it is possible to identify that the generated image is part of continuously-shot images in the meta data of the image data, such that it can be distinguished.

In step S1303, the control unit 101 determines whether or not the OK button 112 is being pressed, and if the OK button 112 is being pressed, the processing advances to step S1304, and if the OK button 112 is not being pressed, the processing advances to step S1308. In step S1304, the control unit 101 sets a flag for setting the images shot continuously as images to be priority transferred.

In step S1305, the control unit 101 searches for the images that have not been set as images to be priority transferred among the images shot continuously. As a result of the search, if there are images that have not been set as images to be priority transferred in step S1306, the processing advances to step S1307, and if there are no images that have not been set as images to be priority transferred, the processing advances to step S1308.

In step S1307, the control unit 101 adds the image-related information of the continuously-shot images not set as images to be priority transferred to the top of the transfer management list, sets their transfer statuses to "awaiting priority transfer", and advances to step S1308.

In step S1308, the control unit 101 determines whether or not the shooting button 116 has continued to be pressed, and if the shooting button 116 has continued to be pressed, the continuous shooting is continuing, and therefore the processing returns to step S1302, and if the shooting button 116 has not continued to be pressed, the continuous shooting has ended, and therefore the processing advances to step S1309. In step S1309, the control unit 101 resets the flag set in step S1304. In step S1310, the control unit 101 performs quick review display of the shot images.

Figure 13:
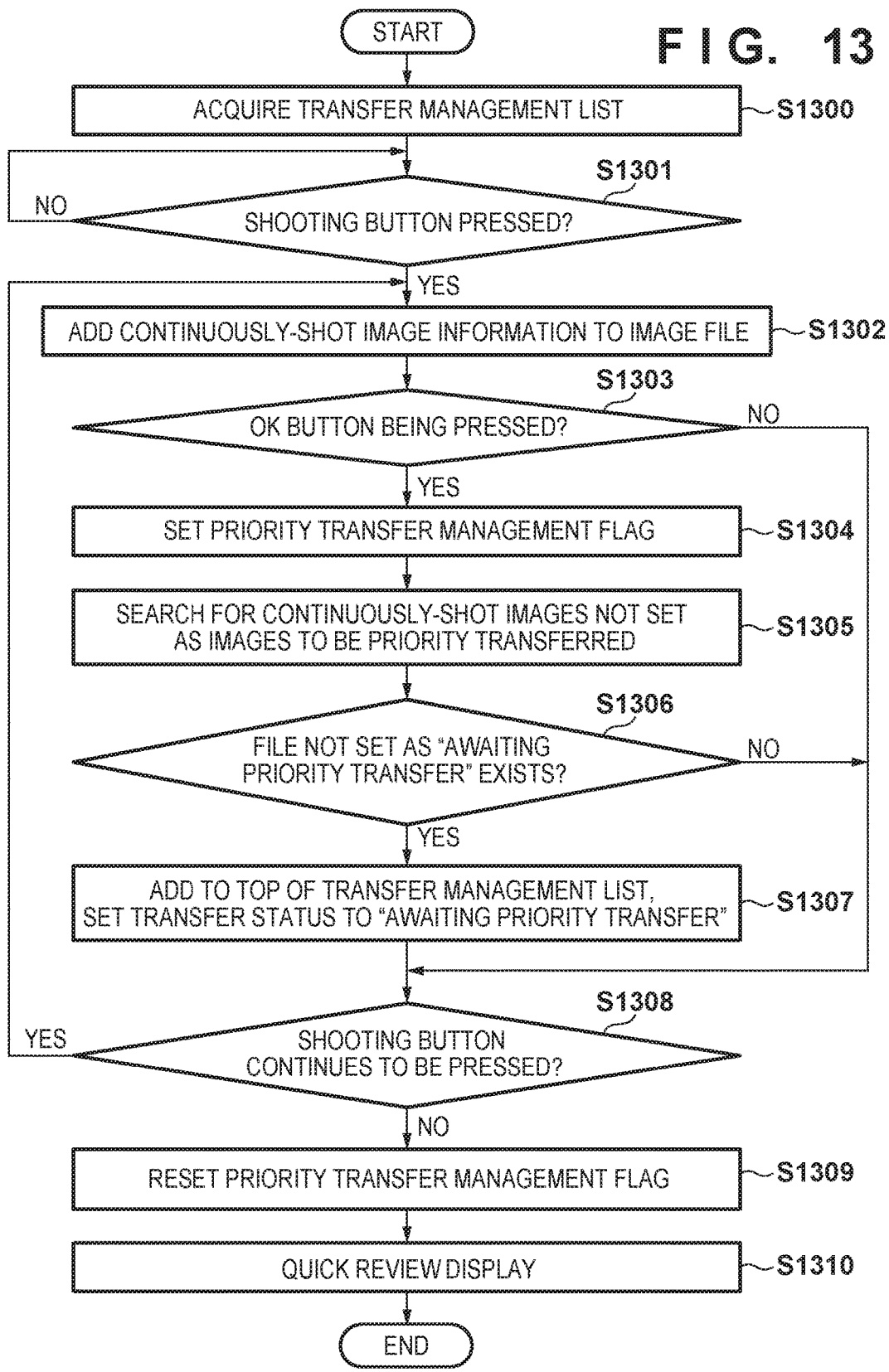
FIG. 13 is a flowchart showing priority transfer processing according to a modified example of FIG. 11.

According to the priority transfer processing of the above-described FIG. 13, the images obtained through continuous shooting can be set as images to be priority transferred quickly with a simple operation that can be performed during continuous shooting, and therefore it is possible to provide a means for accurately responding to a desire to transfer an image as quickly as possible. For example, such a means may be useful in a case in which it is better to transfer all shot images and have the transfer destination select them instead of having the photographer at the transfer source select the images to be transferred. Also, a photographer can transfer continuously shot images with priority with minimal labor in the case where there is no time to check the continuously shot images and check which images are to be transferred with priority when images are shot continuously, such as a case requiring urgency.

Next, a method for setting the transfer sequence of the continuously-shot images set as images to be priority transferred will be described with reference to FIG. 14.

Reference numeral 1400 illustrate a setting screen for changing the transfer sequence of continuously-shot images set as images to be priority transferred. In the present embodiment, the transfer sequences "order", "skip", and "center" can be selected on the setting screen shown in FIG. 14. Reference numeral 1401 indicates a continuously-shot image. In the example shown in the drawing, an operation performed when five images are shot continuously is described. Reference numeral 1402 illustrates content registered in the transfer management list in the case where "order" has been selected on the setting screen 1400. In the case where "order" was selected as the priority level, the images are added to the transfer management list in the order in which they were continuously shot, and the transfer statuses are set to "awaiting transfer". As described above, the condition under which the continuously-shot images are set to be images to be priority transferred is that the shooting button 116 has been pressed with the OK button 112 pressed.

Reference numeral 1403 illustrates content registered in the transfer management list in the case where "skip" has been selected on the setting screen 1400. If "skip" is selected as the priority level, the images at odd places or at even places in the sequence among the continuously-shot images are added to the front of the transfer management list. In the example shown in the drawing, IMG_0001, IMG_0003, and IMG_0005 are added to the front of the transfer management list, and IMG_0002 and IMG_0004 are added thereafter. Accordingly, a setting according to which similar images at adjacent shooting timings are transferred later can be performed.

Reference numeral 1404 illustrates content registered in the transfer management list in the case where "center" has been selected on the setting screen 1400. In the case where "center" has been selected as the priority level, the images in the middle of the shooting sequence among the continuously-shot images are added to the top of the transfer management list, the images adjacent to those images are added next, and the remaining images are added to the end. In the example shown in the drawing, IMG_0003 is added to the top of the transfer management list, IMG_0002 and IMG_0004, which are adjacent to IMG_0003, are added thereafter in the transfer management list, and IMG_0001 and IMG_0005 are added to the end. Accordingly, images in which a crucial moment was shot near the middle of a continuous shot can be transferred with priority.

Figure 14:
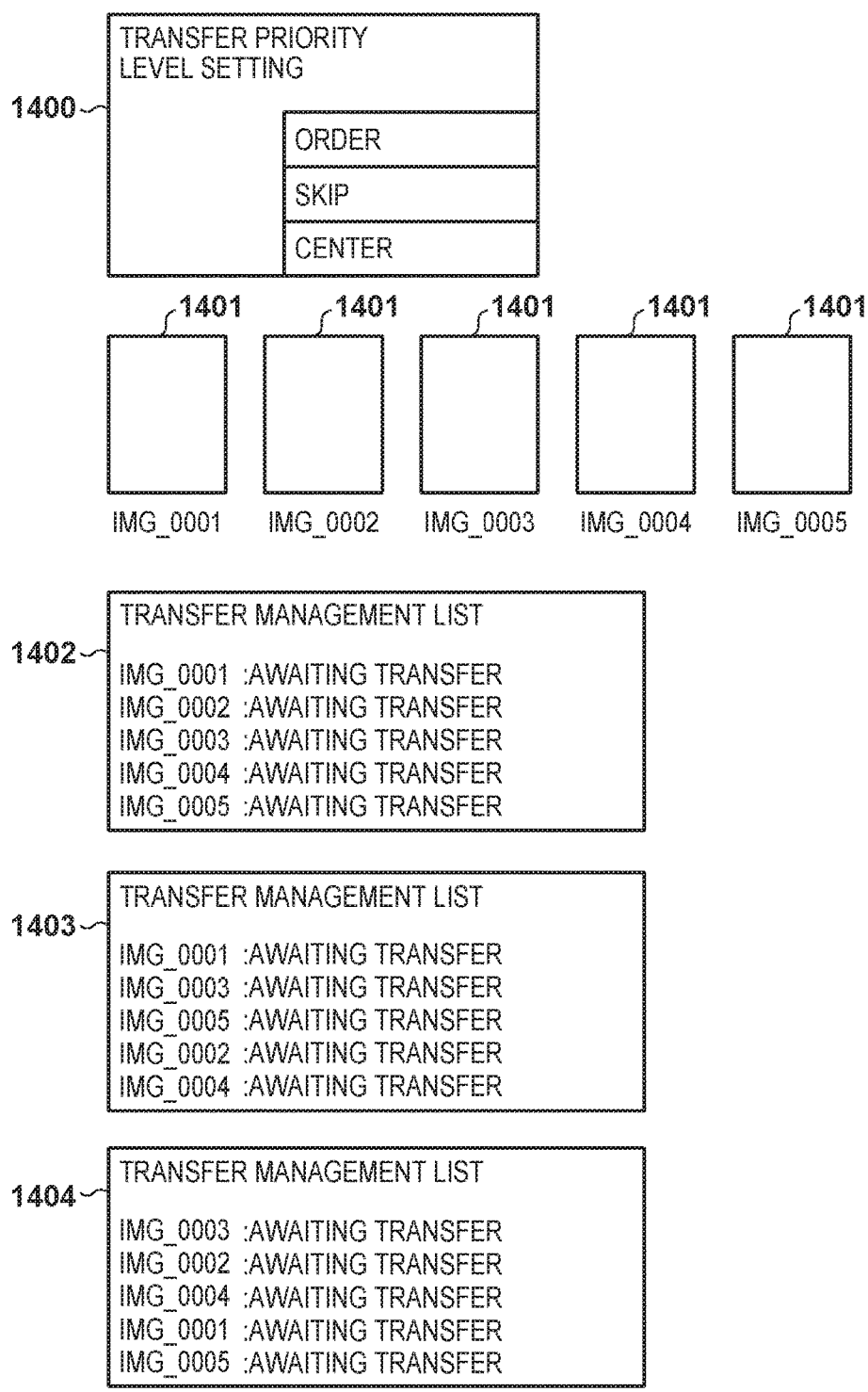
FIG. 14 is a diagram for illustrating a method of setting a transfer sequence for priority transfer processing.

By setting the transfer sequence of the continuously-shot images to be priority transferred in advance as shown in FIG. 14, the images to be priority transferred can be transferred with a desired sequence without performing a separate operation during an operation for continuous shooting. Accordingly, it is possible to provide a means of accurately responding to the desire to transfer an image with a high priority level as soon as possible, and for example, such a means may be helpful when an editor at the transfer destination selects a transferred image.

Embodiment 3

Next, Embodiment 3 will be described with reference to FIGS. 15A to 15D.

The present embodiment describes processing for continuing processing for setting and transferring images to be priority transferred until the reproduction mode ends in the case where an operation for setting images to be priority transferred (simultaneous long-pressing of the OK button 112 and the set button 113) is performed during image reproduction.

FIGS. 15A to 15D show processing for setting and transferring an image to be priority transferred during image reproduction in the present embodiment.

Figure 15A:
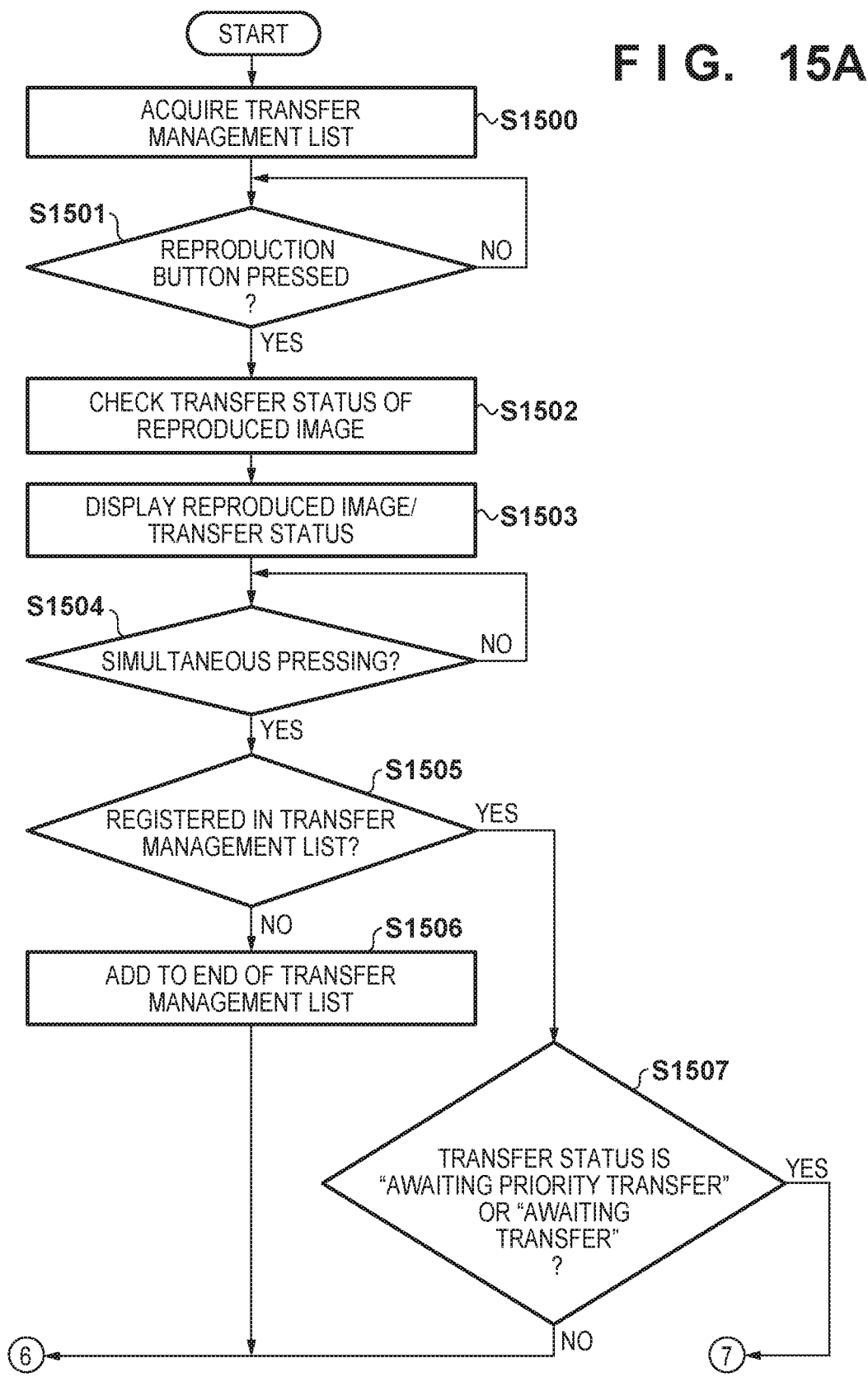
Figure 15C:
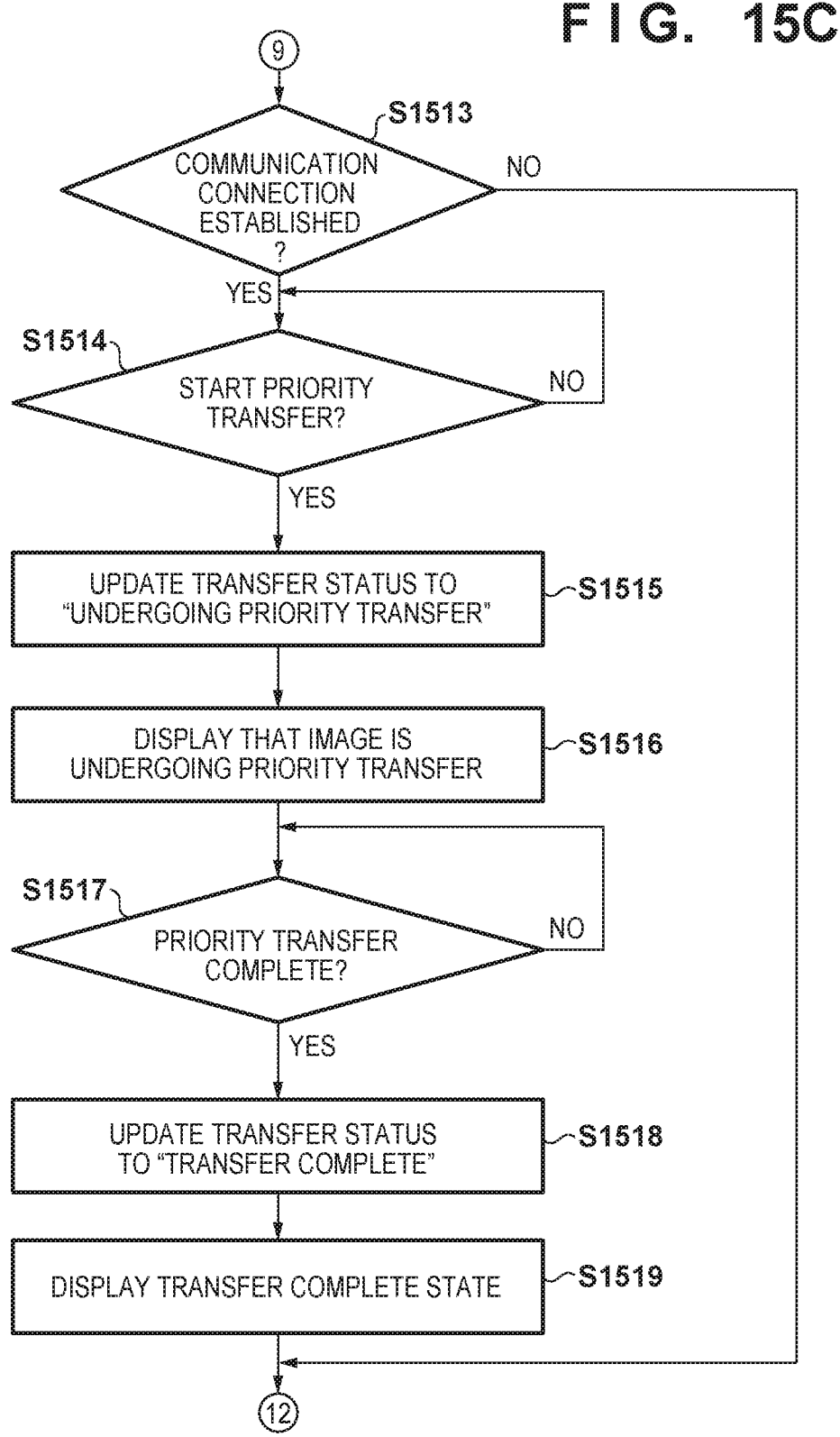

Note that steps S1500 to S1521 in FIGS. 15A to 15C are the same as steps S900 to S921 in FIGS. 9A to 9C of Embodiment 1, and therefore description thereof is not included.

The processing advances to step S1522 if no connection with the external apparatus 200 has been established in step S1513, or after the transfer complete state shown in FIG. 5E is displayed in step S1519.

In step S1522, the control unit 101 determines whether or not the reproduction mode is continuing, and if the reproduction mode is continuing, the processing advances to step S1523, and if the reproduction mode has ended, the processing ends. Here, a case in which the shooting button 116 is pressed, a case in which a user performs a predetermined operation (e.g., a case in which a menu button for displaying a menu screen is pressed), and the like are envisioned as conditions for ending the reproduction mode.

In step S1523, the control unit 101 determines whether or not the OK button 112 or the set button 113 is pressed, and if neither is pressed, the processing returns to step S1523, and if one is pressed, the processing advances to step S1524.

In step S1524, the control unit 101 checks whether or not an image being reproduced exists in the transfer management list acquired in step S1500, and if it does not exist in the transfer management list, the processing advances to step S1525, and if it does exist, the processing advances to step S1526.

In step S1525, the control unit 101 adds the image-related information of the image being reproduced to the top of the transfer management list, sets its transfer status to "awaiting priority transfer", and advances to step S1528. In step S1528, the control unit 101 displays an index indicating that the image is an image to be priority transferred on the display unit 109 by overlaying it on the shot image, and enters the state shown in FIG. 5C. Thereafter, the processing returns to step S1513, and the processing from step S1513 onward is performed repeatedly while in the reproduction mode.

In step S1526, the control unit 101 uses the transfer management list to check whether or not the transfer status of the image being reproduced is "awaiting priority transfer", and if it is "awaiting priority transfer", the processing advances to step S1520, and if not, the processing advances to step S1527. In step S1527, the control unit 101 moves the image-related information of the image being reproduced to the top of the transfer management list, sets its transfer status to "awaiting priority transfer", and advances to step S1528.

According to the above-described priority transfer processing of FIGS. 15A to 15D, the setting of the images to be priority transferred can be performed continuously with a simple operation (e.g., an operation of pressing the OK button 112 or the set button 113 individually). Accordingly, it is possible to provide a means of accurately responding to the desire to transfer an image as soon as possible.

Note that in FIG. 15D, description was given in which the processing for setting and transferring the images to be priority transferred ends in the case where the reproduction mode has ended in step S1522, but a case in which a predetermined amount of time has elapsed since the image was reproduced, a case in which the user performs a predetermined operation, and the like may be used as conditions under which the processing ends.

Note that in the above-described embodiments, an operation of combining two buttons (the OK button 112 and the set button 113) was used as a condition under which the processing for setting and transferring the images to be priority transferred is started, but it is also possible to use an operation of combining three or more buttons.

Also, in the above-described embodiments, an example was described in which the transfer statuses of images to be transferred and images to be priority transferred are displayed by icons, but there is no particular limitation to display of icons, and it is also possible to use display of a message or the like. The display method encompasses every method that can be implemented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-031383, filed Feb. 22, 2017 and 2017-207384, filed Oct. 26, 2017, which are hereby incorporated by reference herein in their entirety.

What is claimed is:

1. A communication apparatus, comprising:
a communication unit capable of communicating with an external apparatus;
a display unit configured to display an image;
an operation unit configured to accept a user operation; and
a designation unit configured to, in response to a first operation of pressing both a first operation member and a second operation member being performed during display of an image, designating the image being displayed as an image to be transferred, which is to be transferred to the external apparatus,
wherein in response to a second operation that is different from the first operation and uses a plurality of operation members being performed, the designation unit designates the image being displayed as an image to be priority transferred, which is to be transferred with greater priority than the image to be transferred, and
the plurality of operation members to be used in the second operation include at least one of the first operation member and the second operation member.

2. The apparatus according to claim 1, wherein the second operation is an operation of pressing both the first operation member and the second operation member continuously for a predetermined amount of time or more during display of the image.

3. The apparatus according to claim 1, wherein the second operation is an operation of instructing a start of image capturing processing with the first operation member in the pressed state.

4. The apparatus according to claim 1, wherein the second operation is an operation of designating the image being displayed as an image to be priority transferred in response to the first operation member being put in the pressed state and the second operation member being put in the pressed state a predetermined number of times within a predetermined amount of time during display of the image.

5. The apparatus according to claim 1, wherein the second operation is an operation in which the first operation member and the second operation member are pressed a predetermined number of times within a predetermined amount of time.

6. The apparatus according to claim 1, wherein the designation unit cancels the designation of an image to be transferred or the designation of an image to be priority transferred for the image being displayed, in response to the first operation being performed once again within a predetermined amount of time from when the first operation is performed.

7. The apparatus according to claim 3, wherein the first operation member is an operation member that is different from the operation member for instructing the start of image capturing processing.

8. The apparatus according to claim 6, wherein the designation unit cancels the designation of the image to be priority transferred for the image being displayed, in response to the first operation being performed after the image being displayed is designated as an image to be priority transferred.

9. The apparatus according to claim 3, wherein the designation unit designates the image being displayed as an image to be priority transferred, in response to the first operation being performed during display of the image immediately after the image capturing processing.

10. The apparatus according to claim 1, wherein the display unit displays a first index indicating that the image has been designated as an image to be transferred, by overlaying the first index on the image to be transferred.

11. The apparatus according to claim 10, wherein the display unit displays a second index indicating that the image has been designated as an image to be priority transferred, by overlaying the second index on the image to be priority transferred.

12. The apparatus according to claim 11, wherein the first index and the second index include a third index indicating that an image is awaiting transfer, a fourth index indicating that an image is undergoing transfer, and a fifth index indicating that transfer is complete.

13. The apparatus according to claim 1, wherein the designation unit has a transfer management list for managing the image to be transferred and the image to be priority transferred, and
images to be transferred are transferred in a sequence in which they are registered in the transfer management list.

14. The apparatus according to claim 13, wherein the designation unit updates the transfer management list such that the image to be priority transferred is transferred with greater priority than an image to be transferred that already exists in the transfer management list.

15. The apparatus according to claim 14, wherein the transfer management list includes information indicating image-related information of the image to be transferred and information indicating a transfer state of that image, and
the transfer states include "awaiting transfer", "undergoing transfer", and "transfer complete" for the image to be transferred and the image to be priority transferred.

16. The apparatus according to claim 15, wherein when transfer of the image to be transferred and the image to be priority transferred is complete, the designation unit deletes the image-related information of those images from the transfer management list.

17. The apparatus according to claim 1, wherein the display unit reproduces an image recorded in a recording unit.

18. The apparatus according to claim 1, wherein the first operation member and the second operation member are operation members located at positions where a user can operate them with different hands.

19. The apparatus according to claim 3, wherein the first operation member and an operation for instructing a start of image capturing processing are operation members located at positions where a user can operate them with different hands.

20. The apparatus according to claim 3, wherein the designation unit determines whether or not a continuous shooting instruction, which is performed by continuing to press an operation member for instructing the start of the image capturing processing, has been performed, and
the designation unit designates all of the images that were continuously shot in response to the first operation member being pressed during the continuous shooting as images to be priority transferred.

21. The apparatus according to claim 20, further comprising a setting unit configured to set a transfer sequence of the images to be priority transferred that were shot continuously.

22. The apparatus according to claim 20, wherein the designation unit designates the images selected by continuously performing the first operation for a predetermined amount of time or more in the state in which the continuously shot images are being reproduced, as images to be priority transferred.

23. A communication apparatus, comprising:
a communication unit capable of communicating with an external apparatus;
a display unit configured to display an image;
an operation unit configured to accept a user operation; and
a designation unit configured to, in response to a first operation of pressing both a first operation member and a second operation member being performed during display of an image, designating the image being displayed as an image to be transferred, which is to be transferred to the external apparatus,
wherein the designation unit designates the image being displayed as an image to be priority transferred in response to an operation of pressing both the first operation member and the second operation member during display of an image immediately after image capturing processing.

24. A control method of a communication apparatus which has a communication unit capable of communicating with an external apparatus, a display unit configured to display an image, and an operation unit configured to accept a user operation, the method comprising:
designating, in response to a first operation of putting both a first operation member and a second operation member in a pressed state being performed during display of an image, the image being displayed as an image to be transferred, which is to be transferred to the external apparatus, and
designating the image being displayed as an image to be priority transferred, which is to be transferred with greater priority than the image to be transferred, in response to a second operation, which is different from the first operation and uses a plurality of operation members, being performed,
wherein the plurality of operation members to be used in the second operation include at least one of the first operation member and the second operation member.

25. A control method of a communication apparatus which has a communication unit capable of communicating with an external apparatus, a display unit configured to display an image, and an operation unit configured to accept a user operation, the method comprising:
designating, in response to a first operation of putting both a first operation member and a second operation member in a pressed state being performed during display of an image, the image being displayed as an image to be transferred, which is to be transferred to the external apparatus, and
designating the image being displayed as an image to be priority transferred in response to an operation of pressing both the first operation member and the second operation member being performed during display of an image immediately after image capturing processing.

26. A non-transitory computer-readable storage medium storing a program for causing a computer to function as a communication apparatus, comprising:
- a communication unit capable of communicating with an external apparatus;
- a display unit configured to display an image;
- an operation unit configured to accept a user operation; and
- a designation unit configured to, in response to a first operation of pressing both a first operation member and a second operation member being performed during display of an image, designating the image being displayed as an image to be transferred, which is to be transferred to the external apparatus,
- wherein in response to a second operation that is different from the first operation and uses a plurality of operation members being performed, the designation unit designates the image being displayed as an image to be priority transferred, which is to be transferred with greater priority than the image to be transferred, and
- the plurality of operation members to be used in the second operation include at least one of the first operation member and the second operation member.

27. A non-transitory computer-readable storage medium storing a program for causing a computer to function as a communication apparatus, comprising:
- a communication unit capable of communicating with an external apparatus;
- a display unit configured to display an image;
- an operation unit configured to accept a user operation; and
- a designation unit configured to, in response to a first operation of pressing both a first operation member and a second operation member being performed during display of an image, designating the image being displayed as an image to be transferred, which is to be transferred to the external apparatus,
- wherein the designation unit designates the image being displayed as an image to be priority transferred in response to an operation of pressing both the first operation member and the second operation member during display of an image immediately after image capturing processing.

* * * * *